(12) United States Patent
Subbiah et al.

(10) Patent No.: US 7,996,588 B2
(45) Date of Patent: Aug. 9, 2011

(54) METHOD AND APPARATUS FOR REAL-TIME TRANSPORT OF MULTI-MEDIA INFORMATION IN A NETWORK

(75) Inventors: Baranitharan Subbiah, Sunnyvale, CA (US); Sanjay Katabathuni, Sunnyvale, CA (US); Shoby A. Cherian, Milpitas, CA (US); Chi-Lie Wang, Fremont, CA (US); Maria Hu, Milpitas, CA (US); Sudhakar Rao, Cupertino, CA (US); Kap Soh, Fremont, CA (US); Scott W. Mitchell, San Jose, CA (US); Raymond Su, San Jose, CA (US); Lomberto P. Jimenez, Hollister, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 2179 days.

(21) Appl. No.: 10/449,816

(22) Filed: May 30, 2003

(65) Prior Publication Data
US 2004/0068535 A1 Apr. 8, 2004

Related U.S. Application Data

(60) Provisional application No. 60/416,113, filed on Oct. 4, 2002.

(51) Int. Cl.
| | |
|---|---|
| G06F 13/12 | (2006.01) |
| G06F 3/00 | (2006.01) |
| G06F 15/173 | (2006.01) |
| G06F 15/16 | (2006.01) |

(52) U.S. Cl. ............... 710/72; 710/29; 710/30; 710/36; 709/223; 709/250

(58) Field of Classification Search .................. None
See application file for complete search history.

(56) References Cited

U.S. PATENT DOCUMENTS

| | | | |
|---|---|---|---|
| 5,994,998 A | 11/1999 | Fisher et al. | |
| 6,140,911 A | 10/2000 | Fisher et al. | |
| 6,329,906 B1 | 12/2001 | Fisher et al. | |
| 6,353,169 B1 | 3/2002 | Juszkiewicz et al. | |
| 6,496,105 B2 | 12/2002 | Fisher et al. | |
| 7,142,557 B2 * | 11/2006 | Dhir et al. | 370/463 |
| 2003/0172797 A1 * | 9/2003 | Juszkiewicz et al. | 84/601 |

OTHER PUBLICATIONS

U.S. Appl. No. 10/281,831, Fisher et al.
U.S. Appl. No. 10/281,778, Fisher et al.
Juszkiewicz et al, "Media-accelerated Global Information Carrier", Revision 2.4 (© 1999-2001, Gibson Guitar Corporation), pp. i -52.
"CS18101 Digital Audio Networking Processor" (© 2003, Cirrus Logic, Inc.), downloaded from http://www.peakaudio.com/CobraNet/CS18101/advanced_info.htm.
"CobraNet• CM-1 Digital Audio Network Interface Module", Product Bulletin 0087-0403-PB-ADP (© 2003, Cirrus Logic, Inc.), downloaded from http://www.cirrus.com/en/products/.

(Continued)

Primary Examiner — Alan Chen

(57) ABSTRACT

In one embodiment of a networking module, a first block receives a serial digital media signal, and provides a parallel digital media signal based on the serial digital media signal. A second block, operative with the first block, stores the parallel digital media signal in a corresponding slot in an outgoing frame, and sends the outgoing frame in response to receiving an incoming frame.

5 Claims, 27 Drawing Sheets

OTHER PUBLICATIONS

"CobraNet• CM-2 Digital Audio Network Interface Module", Product Bulletin 0088-0303-PB-ADP (© 2003, Cirrus Logic, Inc.), downloaded from http://www.cirrus.com/en/products/.

"EV-2 CobraNet• Evaluation/Developer's Kit", Product Bulletin 0089-0303-PB-ADP (© 2003, Cirrus Logic Inc.), downloaded from http://www.cirrus.com/en/products/.

"Competitive Analysis", (© 2000-2002, Peak Audio), downloaded May 29, 2003 from http://www.peakaudio.com/CobraNet/CompetitiveAnalysis.html.

"QSC/Rave Wins Big Behind-The-Scenes at 45th Grammys" (© 2000-2002, Peak Audio), downloaded May 29, 2003 from http://www.peakaudio.com/CobraNet/licensee/grammys2003.html.

"Yamaha mLAN: Digital Audio Network Technology Based on IEEE 1394", (© 2000, Yamaha Corporation of America), downloaded May 28, 2003 from http: //www.giles.com/yamaha1/pressreleases/ProAudio/mLan.htm.

"Technical Brief for the mLAN-NC1 (Node Controller)", downloaded May 28, 2003 from http: //www.yamaha.co.jp/tech/1394mLAN/english/rel-nc1.html.

"MaGIC Evaluation Board System", (© 2003, Gibson Guitar Corp.), downloaded May 29, 2003 from http://gibsonmagic.com/eval.html.

"Howstuffworks : How PCI Works", (© 1998-2003, HowStuffWorks, Inc. ), downloaded May 29, 2003 from http : //computer.howstuffworks.com/pci.htm/printable.

"NEC Electronics America, Inc.: Interface Technologies: USB 2.0", downloaded May 28, 2003 from http:/ /www.necelam.com/interface/uPD720100A.cfm.

"Philips Semiconductors-12C-About the 12C-bus" (© 2003, Koninklijke Philips Electronics N.V.), downloaded Jul. 15, 2003 from http://www.semiconductors.philips.com/buses/i2c/facts/.

"Guitar Maker Preps Digital Network Platform", (© 2003, CMP Media, LLC), downloaded May 27, 2003 from http://www.eet.com/story/0EG20030124S0035.

"Home Entertainment Networking Around the House", p. 1E, San Jose Mercury News, Apr. 24, 2003.

"Sony Misses Link with PC Hookup", p. 3E, San Jose Mercury News, Apr. 24, 2003.

"I2S—A Whatis Definition", (© 2000-2003, TechTarget), downloaded Jul. 15, 2003 from http:/ /whatis.techtarget.com/definition/0,,sid9_gci817575,00.html.

Juszkiewicz et al, "Media-accelerated Global Information Carrier", Revision 2.8, Revision History, Jul. 5, 2002, (© 1999-2001, Gibson Guitar Corporation), downloaded Mar. 11, 2003 from http:/ /www.gibsonmagic.com/specification.html.

\* cited by examiner

100 ⬎

| Word | B32-B28 | B27-B24 | B23-B20 | B19-B16 | B15-B12 | B11-B8 | B7-B4 | B3-B0 |
|---|---|---|---|---|---|---|---|---|
| 0 | 5 | 5 | 5 | 5 | 5 | 5 | 5 | 5 |
| 1 | D | 5 | 5 | 5 | 5 | 5 | 5 | 5 |
| 2 | colspan 104 Destination MAC Address ||||||||
| 3 | 102 Source MAC Address |||| Destination MAC Address continued ||||
| 4 | Source MAC Address continued ||||||||
| 5 | | | | | 106 Length ||||
| 6 | ||||||||
| 7 | ||||||||
| 8 | RESERVED FOR NETWORKING HEADERS ||||||||
| 9 | ||||||||
| 10 | ||||||||
| 11 | ||||||||
| 12 | Config. || Bits | CableNum | S-Rate ||||
| 13 | Frame Count/Timecode ||||||||
| 14 | Audio Valid ||||||||
| 15 | Audio Express ||||||||
| 16 | Audio Slot 1 ||||||||
| 17 | Audio Slot 2 ||||||||
| 18 | Audio Slot 3 ||||||||
| 19 | Audio Slot 4 ||||||||
| 20 | Audio Slot 5 ||||||||
| 21 | Audio Slot 6 ||||||||
| 22 | Audio Slot 7 ||||||||
| 23 | Audio Slot 8 ||||||||
| 24 | Audio Slot 9 ||||||||
| 25 | Audio Slot 10 ||||||||
| 26-47 | Audio Slots 11-32 ||||||||
| 48 | 112 Control Message |||| 114 Version ||| Configuration |
| 49 | 118 Destination Device Address |||| 120 Source Device Address ||||
| 50 | 124 Destination Component Address |||| 122 Source Component Address ||||
| 51 | 126 Control Data 1 ||||||||
| 52 | 128 Control Data 2 ||||||||
| 53 | 130 Control Data 3 ||||||||
| 54 | 110 CRC32 ||||||||

Two-Port Module

I2S Sequencer Flow Diagram

I2S Serial Shift In Register and Parallel Input Buffer

I2S Parallel Output Buffer and Serial Shift Out Register

METHOD AND APPARATUS FOR REAL-TIME TRANSPORT OF MULTI-MEDIA INFORMATION IN A NETWORK

CLAIM TO PRIORITY

The present application claims priority to U.S. Provisional Patent Application Ser. No. 60/416,113 entitled "Method and Apparatus for Networking Musical Instruments", filed Oct. 4, 2002, which is incorporated by reference herein for all purposes.

BACKGROUND OF THE DISCLOSURE

1. Field of the Invention

The invention relates to a method and apparatus for real-time transport of information in a network. This invention is particularly, though not exclusively, suited for use with multi-media devices.

2. Description of the Related Art

Professionals in the music industry demand high quality audio. Typically, coaxial cables have been used to interconnect musical instruments and professional audio equipment, and such cabling has become cumbersome to install, and expensive.

Ethernet technology uses standard Category 5 (Cat 5) cables that have eight conductors and RJ-45 connectors at each end. The Cat 5 cables are cost effective and easy to install. Recently, ethernet technology has enabled digital musical instruments and professional audio equipment, such as guitars, keyboards, amplifiers and mixers, to transmit and receive real-time digital signals in a cost effective manner while maintaining low latency and high quality.

Various Ethernet-based media transport protocols (MTP) may provide connectivity and control of digital musical instruments and equipment. For example, U.S. Pat. No. 6,353,169, granted to Henry E. Juszkiewicz et al on Mar. 5, 2002 provides a universal audio communications and control system, including the Media-accelerated Global Information Carrier (Magic® (Registered trademark of Gibson Guitar Corporation, Nashville, Tenn.)) protocol.

Conventional circuit boards are designed for one particular media transport protocol and cannot be easily adapted to implement other protocols. In addition, the circuit boards are not easily adapted to be used with different kinds of audio devices. Furthermore, to modify software in conventional circuit board, the circuit board is removed from a device and the memory reprogrammed. Removing a circuit board is a cumbersome task. In addition, conventional circuit boards have many integrated circuits and are expensive to implement.

Therefore, there is a need for an apparatus that can be easily adapted to implement various Ethernet-based media transport protocols. This apparatus should also be easily adapted to be used in different devices. In addition, this device should be able to be modified easily, and provide a cost-effective implementation.

SUMMARY OF THE INVENTION

To overcome the limitations in the prior art described above, and to overcome other limitations that will become apparent upon reading and understanding the present specification, the present invention discloses a networking module (NM). In one embodiment of the networking module, a first block receives a serial digital media signal, and provides a parallel digital media signal based on the serial digital media signal. A second block, operative with the first block, stores the parallel digital media signal in a corresponding slot in an outgoing frame, and sends the outgoing frame in response to receiving an incoming frame.

In another embodiment of the networking module, a first block receives an incoming frame having a plurality of slots, and extracts a parallel digital media signal from a corresponding one of the slots. A second block, operative in response to the first block, receives the parallel digital media signal, and provides a serial digital media signal based on the parallel digital media signal.

In yet another embodiment of the networking module, a first block receives a serial digital media signal, and provides a parallel digital media signal based on the serial digital media signal. The first block is operatively coupled to a first port to receive a first incoming frame. A second block, operative with the first block, stores the parallel digital media signal in a slot in the first incoming frame to produce a combined frame, and sends the combined frame to a second port in response to receiving a timing frame from the second port.

BRIEF DESCRIPTION OF THE DRAWINGS

The teachings of the present invention can be readily understood by considering the following detailed description in conjunction with the accompanying drawings, in which:

FIG. 2 depicts an exemplary frame that carries audio or video information in accordance with the Magic media transport protocol;

To facilitate understanding, identical reference numerals have been used, where possible, to designate identical elements that are common to some of the figures.

DETAILED DESCRIPTION OF THE PREFERRED EMBODIMENTS

The present invention provides a networking module that has a flexible architecture which can be adapted to implement many media transport protocols. For simplicity, the present invention will be described with respect to an ethernet-based media transport protocol (MTP), and the frames generated by this MTP are referred to as MTP frames. The networking module has a modular architecture such that functional blocks can be added or removed with ease. Therefore the networking module may be easily adapted to different devices. A single port networking module will first be described with respect to an audio source. Next a single port networking module will be described with respect to an audio destination. Finally various embodiments of a two port networking module will be described. In another embodiment, the networking module has a flash memory which can be programmed via an interface by an external computer, therefore allowing the software of the networking module can be modified easily. Although the invention will be described with respect to audio signals, the invention can also be used with video signals.

In particular, the present invention will be described with respect to the Magic protocol, as in the Magic Engineering Specification, Revision 2.4. The Magic protocol is also described in U.S. Pat. No. 6,454,169. U.S. Pat. No. 6,454,169 to Henry E. Juszkiewicz et al for a universal audio communications and control system and method, is incorporated herein by reference. Although the invention will be described with respect to Magic Engineering Specification, Revision 2.4, the invention is not meant to be limited to Magic Engineering Specification, Revision 2.4. and may be used with other Revisions of the Magic protocol and with other media transport protocols.

Figure 1:
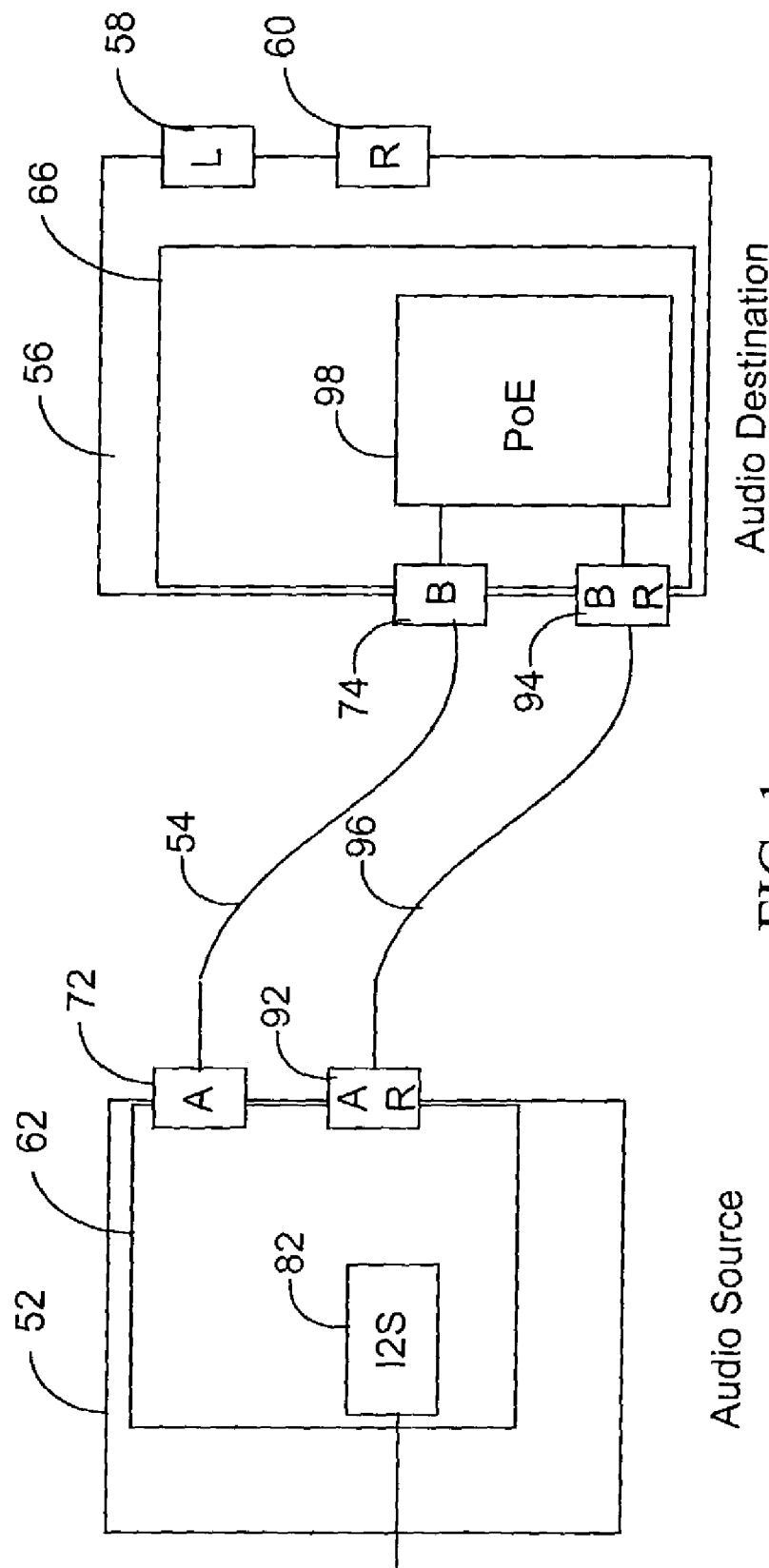
FIG. 1 depicts a high-level block diagram of a single-port networking module of an audio source connected to a single-port networking module of an audio destination.

FIG. 1 depicts a high-level block diagram of an audio source 52 that is connected by a link 54 to an audio destination 56. The audio source 52 and the audio destination 56 each have a networking module, 62 and 66, respectively. In one embodiment, at a physical layer, the link 54 is a Category 5 cable. The links 54 are implemented based on the 100 Base-TX Ethernet physical layer as described in the Institute of Electrical and Electronics Engineers (IEEE) 802.3 Specification. The link 54 provides full duplex communications and operates at 100 megabits per second. In an alternate embodiment, the link may operate at one gigabit per second. The Category 5 cables have four twisted pairs that are 24 gauge or larger, and are standard computer-to-hub Category 5 cables. The Category 5 cables use standard RJ-45 connectors. A first pair is designated as a transmit pair to transport outgoing frames, a second pair is designated as a receive pair to receive incoming frames.

In one embodiment, the audio source 52 is a musical instrument such as a guitar and the audio destination 56 is an amplifier and speakers 58 and 60. Alternately, the audio source 52 may be any of, and not limited to, the following: a musical instrument, a tuner, a CD player, a tape player, a microphone, a video tape player, a DVD player or a personal computer (PC). The audio destination 56 may be any of, and not limited to, the following: an amplifier, headphones, speakers with a built-in amplifier, a mixer, an effects box, a CD recorder, a tape recorder, a DVD recorder, or a PC, and a display.

Each device has an RJ-45 connector that implements a port. Both A-ports and B-ports transmits and receive frames. An A-port 72 is a Magic port with one-to-one wiring with respect to the cable. A B-port 74 is a Magic port with a signal crossover with respect to the cable. A-ports connect to B-ports. A-ports do not connect to other A-ports, and B-ports do not connect to other B-ports.

The inter-IC sound (I2S) bus is a serial link for digital audio signals. In the audio source 52, a digital audio signal is supplied over an I2S bus 82, placed in a frame and sent to the A-port 72.

The networking modules, 62 and 66, have a media access control address and a device address. The media access control address (MAC address) is a unique identifier that is assigned during the manufacturing process. Using standard IEEE 802.3 protocol, the MAC address is used to assign an internet protocol (IP) address.

The device address may be preassigned, or dynamically assigned by a system timing master during an enumeration process specified by the media transport protocol. The system timing master may be preassigned, or dynamically assigned, depending on the embodiment. In this embodiment, the networking module in the amplifier and speakers is the system timing master and has a device address of zero. The networking module in the guitar has a device address of one.

In an alternate embodiment, redundant, that is failover, A and B ports (AR) and (BR), 92 and 94, respectively, and a failover link 96 are provided. The failover ports will be described in further detail below. In an alternate embodiment, no failover link and no redundant ports are provided. In another alternate embodiment, a power-over-ethernet (PoE) block 98 is coupled to the A and B ports to supply power over the link 54 to the audio source 62. The power-over-ethernet block 98 will be further described below.

Referring to FIG. 2, an exemplary frame 100 in accordance with the Magic media transport protocol is shown. The frame 100 has fifty-four 32-bit words. The frame 100 has a destination MAC address 102 and a source MAC address 104, a length 106, a payload 108 and CRC field 110. The payload 108 contains a Magic packet in words 12-53. Words 16-47 carry digital audio signals for audio slots 1-32, respectively. Control information is passed in words 48-53 which can carry a control message 112, version 114, configuration 116, destination device address 118, source device address 120, destination component address 122, source component address 124, and control data 1, 2 and 3, 126, 128 and 130, respectively.

Referring also to FIG. 1, each networking module, 62 and 66, is associated with a channel or set of channels. The channels carry a digital audio signal. Each channel can be associated with at least one audio slot in the Magic packet or frame. For systems operating at a sampling frequency of forty-eight kilohertz, each channel is associated with one audio slot. When operating at a higher sampling frequency, additional audio slots may be associated with that channel. The association between an audio slot and a channel may be predetermined. Alternately, a control command can be sent to the devices to associate a channel with one or more slots. For example, an electric guitar uses channels 1 through 12, and the channels are associated with audio slots 1 through 12, respectively. In particular, for the electric guitar, the channels may be preassigned as follows:

Channel
Mono guitar (3 mono pick up)
Microphone
Stereo guitar
Hex pick up

For example, the amplifier and speakers 56, device 0, has two output channels. Channel one is for a left speaker and channel two is for a right speaker. In this example, the networking module in the amplifier and speakers has been configured to output the digital audio signals from audio slots five and six, on the left and right speakers, respectively.

In the Magic protocol, a component is a unit that can generate or interpret a command. For example, consider remote volume control in which a knob on a first device acts as a first component which can send a command to adjust the volume to a second device that acts as a second component. The frame format allows source and destination components to be specified, and control commands to be sent.

At initialization, each device assigns a unique unsigned integer address to each of its components. Each component is associated with a parameter type. In the Magic protocol, the parameter types include, but are not limited to, a scale parameter, a toggle parameter, a MIDI parameter and a Blob parameter. The scale parameter is set by a remote device and comprises a current value, a minimum value and a maximum value, and a unit value, which is a predefined amount by which the scale can be incremented and decremented. The toggle parameter is a single binary value having values of 0 and 1, representing OFF and ON, respectively. The MIDI parameter allows MIDI messages to be transmitted within the Magic network. The Blob parameter allows variable amounts of information to be transmitted.

The networking modules operate synchronously. In the Magic protocol, the system timing master (STM) initiates the transmission of frames to synchronize the networking modules. In FIG. 1, the networking module 66 in the amplifier and speakers is the STM and transmits a first frame to the networking module 62 in the guitar from its B-port. In response, when the networking module in the guitar 62 detects that a first frame has arrived on a first pair of wires, the networking module in the guitar 62 responds by sending a frame over another pair of wires back to the amplifier and speakers. The networking module in the guitar 62 does not wait for the entire frame to be received before transmitting its frame. When the networking module 66 in the amplifier and speakers receives the frame from the networking module 62 in the guitar, the networking module 66 in the amplifier and speakers outputs the audio signal from the specified audio slots in the frame.

The Magic protocol defines a frame time as 20.84 microseconds. After one frame time has elapsed from sending the first frame, the networking module 66 in the amplifier and speakers transmits a second frame to the networking module 62 in the guitar. The networking module 62 in the guitar transmits the waiting frame to the amplifier and speakers. The process repeats every 20.84 microseconds. In this way, frames that contain digital audio signals are transmitted synchronously and the network operates synchronously.

In the Audio Destination Module 66, the power-over-ethernet (PoE) block 98 supplies power to the networking module and other electronics in the audio source. The PoE block supplies a predetermined DC voltage over pairs of wires that are not used to send and receive packets. In an alternate embodiment, the PoE block 98 supplies a DC voltage over the pairs of wires that send and receive packets. In an alternate embodiment, the destination module 66 does not provide power over ethernet and does not have a PoE block.

Single-Port Source Modules

Figure 3:
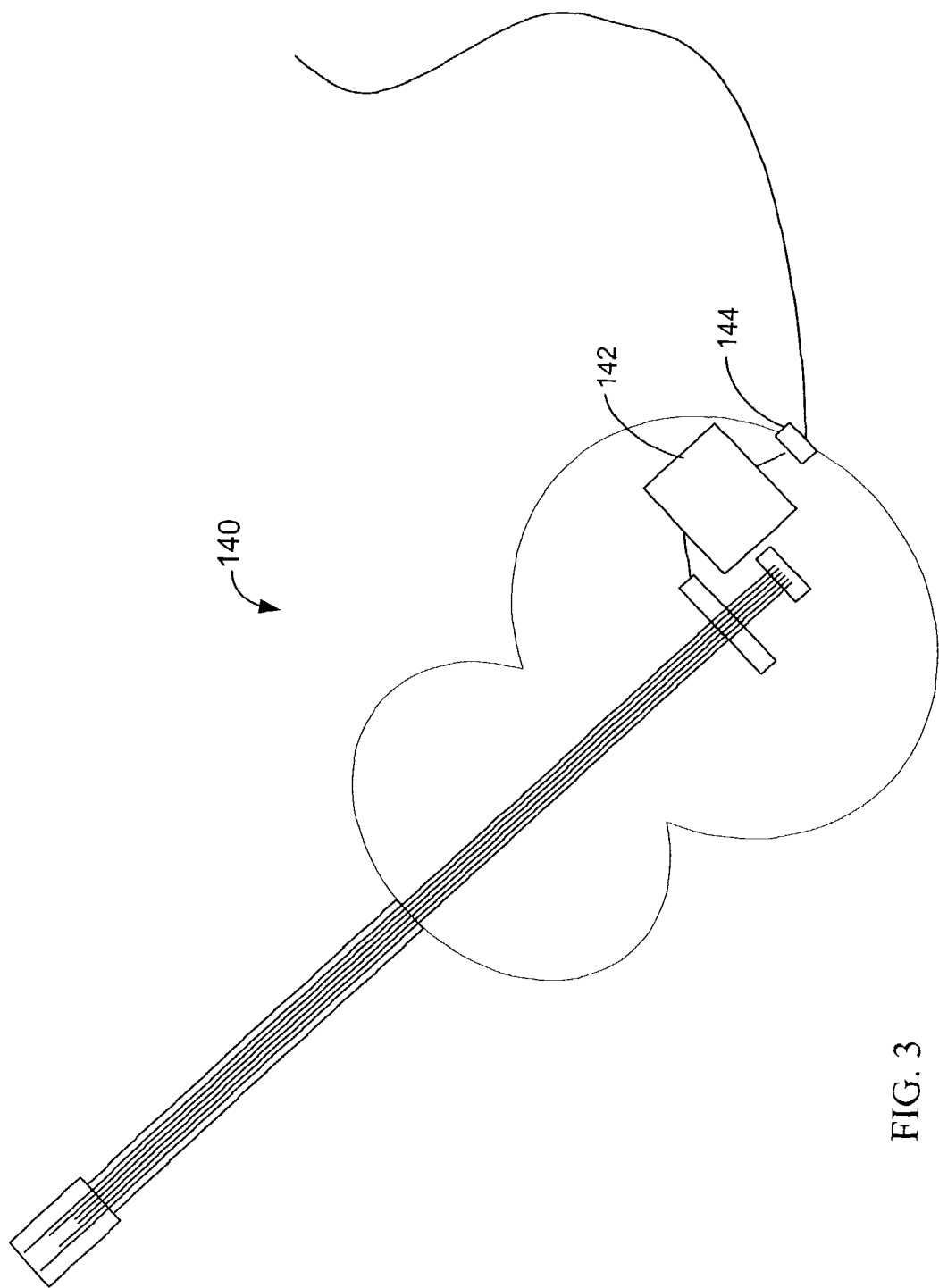
FIG. 3 depicts a high-level block diagram of an exemplary audio source, a guitar, using an embodiment of the single-port networking module.

Referring to FIG. 3, a guitar 140 has an embodiment of a single-port networking module 142. Because the guitar 140 does not have its own power supply, the networking module receives its power over the link via the RJ-45 connector 144.

In an alternate embodiment, the networking module 142 may be provided as a separate unit, rather than being built into the audio source, such as the guitar.

Figure 4:
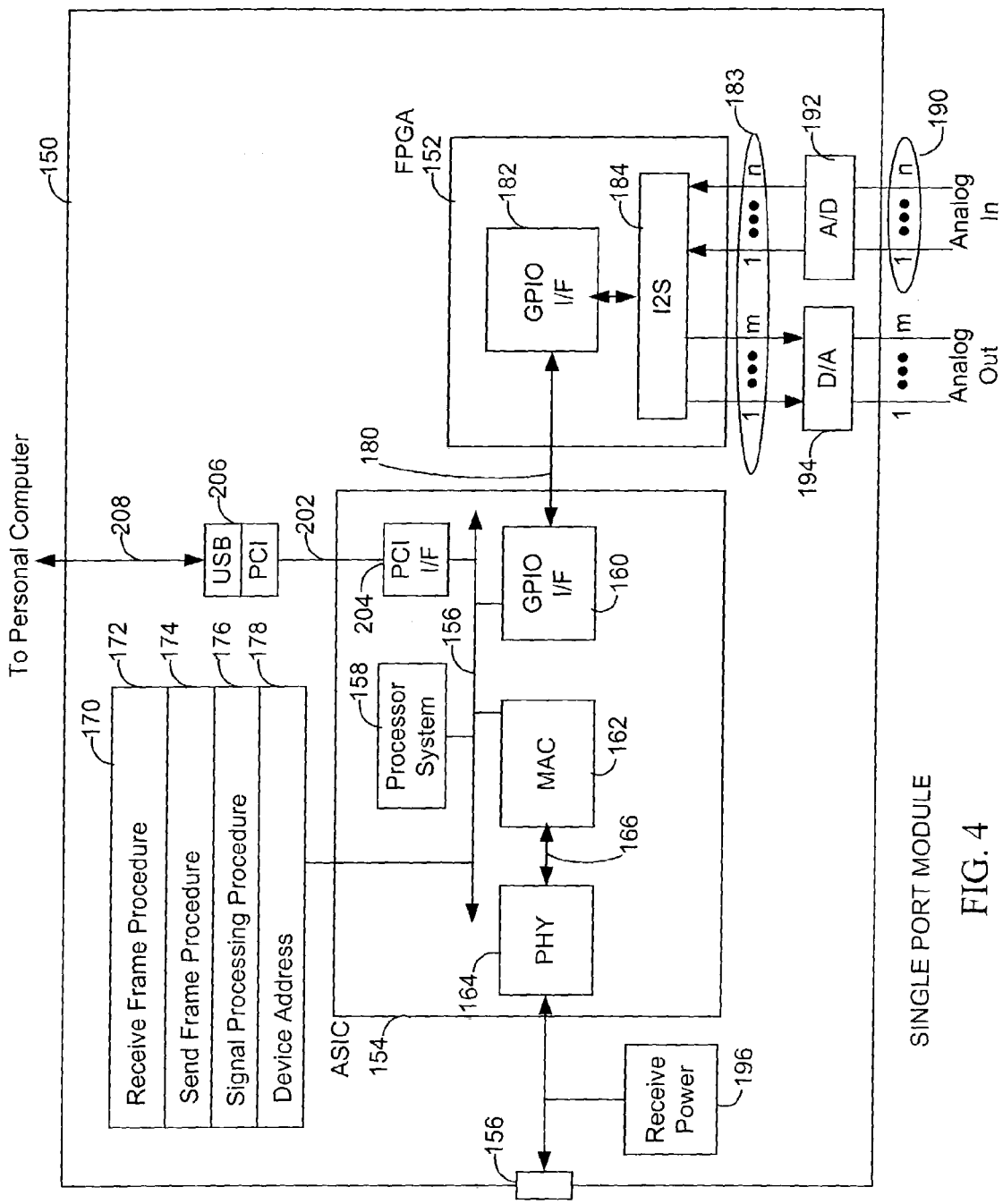
FIG. 4 depicts a block diagram of an embodiment of a single-port networking module comprising a programmable application specific integrated circuit (ASIC) and a field-programmable gate array (FPGA)

FIG. 4 depicts a block diagram of an embodiment of a networking module 150 in accordance with the present invention. In the networking module 150, a first block 152 receives a serial digital media signal, and provides a parallel digital media signal based on the serial digital media signal. A second block 154, operative with the first block 152, stores the parallel digital media signals in corresponding slots in an outgoing frame, and sends the outgoing frame to the A-port 156 in response to receiving an incoming frame. In one embodiment, the first block 152 is a field-programmable gate array (FPGA) and the second block 154 is a programmable application specific integrated circuit (ASIC).

In the ASIC 154, at least one bus 156 couples a processor system 158 to a general purpose input-output (GPIO) interface 160 and a media access controller 162. The media access controller (MAC) 162 provides a data link layer protocol in accordance with the Magic protocol. The MAC 162 transmits and receives fixed-sized frames that contain the digital audio signals at a synchronous predetermined rate.

A physical layer interface (PHY) 164 implements a physical layer protocol. The MAC 162 connects to the PHY 164 over a media-independent interface (MII) bus 166. The media-independent interface bus 166 is well-known and will not be further described. The PHY 164 is coupled to an RJ-45 connector 156 and provides a physical ethernet interface in accordance with the Magic protocol which is based on the IEEE 802.3 standard. In this embodiment, the PHY 162 and MAC 164 operate as an A-port.

The processor system 158 implements an application layer. In one embodiment, the processor system 158 builds a Magic packet with the digital audio signals in the payload field of the frame of the data link layer. In another embodiment, the processor system 158 receives a frame containing a Magic packet, extracts associated digital audio signals from the frames, and outputs those digital audio signals. In another embodiment, the processor system 158 extracts the control information contained in the frame and outputs the control information to the application layer, and alternately, to a personal computer connected to the processor system 158.

A program memory 170 is coupled to the processor system 158 via the Tbus 156. The program memory 170 stores procedures that are executed by the processor system 158. The procedures include, and are not limited to, a receive frame procedure 172, a send frame procedure 174 and, in some embodiments, a signal processing procedure 176. In one embodiment, the program memory is a flash memory. Alternately, the program memory can be a read-only memory. In yet another embodiment, the program memory 170 comprises a flash memory and random access memory (RAM). Using flash memory or RAM allows the software to be modified with ease. In some embodiments, the device address 178 is stored in the program memory 170.

A general purpose input-output (GPIO) bus 180 connects the GPIO interface 160 on the ASIC to a GPIO interface block 182 on the FPGA 152. The GPIO interfaces have registers for exchanging data.

The inter-integrated circuit sound (I2S) bus 183 provides a serial link for digital audio signals. In the FPGA 152, an I2S interface block 184 is coupled to the GPIO interface block 182 and provides an I2S bus interface. The I2S interface block 184 receives serial digital audio signals and converts the serial digital audio signals to parallel digital audio signals, which are supplied to the GPIO interface block 182.

An analog audio source supplies analog audio signals on channels 1-n 190 to an analog-to-digital (A/D) converter 192. In one embodiment, the A/D converter 192 is implemented by an encoder-decoder (CODEC). The A/D converter 192 outputs serial digital audio signals, one for each channel on the I2S bus 183. The I2S interface block 184 of the FPGA 152 receives the serial digital audio signals in I2S format, for each of the channels, 1-n, and stores the serial digital audio signals in registers to provide parallel digital audio signals, 1-n, respectively. The parallel digital audio signals are then stored in registers in the GPIO interface block 182 of the FPGA 152, for output on the GPIO bus 180. In another embodiment, the A/D converter 192 outputs the serial digital audio signal, one for each channel, on a time division multiplexed bus. Although the invention has been described with respect to an I2S bus, the invention is not meant to be limited to an I2S bus and may be used with other digital audio interfaces.

Alternately, the FPGA outputs digital audio signals. At least one parallel digital audio signal is received by the GPIO interface 182 of the FPGA 152 and sent to the I2S interface block 184. The I2S interface block 184 converts the parallel digital audio signals to serial digital audio signals which are output to a digital-to-analog (D/A) converter 194. The D/A converter 194 converts serial digital audio signals to respective analog audio signals. In another alternate embodiment, the I2S interface block 184 both receives and outputs digital audio signals.

In another embodiment, the A/D and D/A converters, 192 and 194, respectively, are on the networking module 150. In an alternate embodiment, the A/D and D/A converters are not on the networking module 150. In yet another embodiment, a single encoder-decoder (CODEC) implements both the A/D and D/A converters.

A receive power block 196 receives power over the RJ-45 connector and converts the voltage levels to levels suitable for use with the circuitry of the networking module. Because the Category 5 cable can supply up to 48 volts DC, the networking module has a non-linear switcher, such as the LM2592HV from National Semiconductor Inc., that provides a constant five volt DC supply to the networking module based on the power supplied over the Category 5 cable. In an alternate embodiment, the networking module does not have a receive power block 196 and does not receive power via the RJ-45 connector.

A peripheral component interconnection (PCI) bus is a well-known bus for connecting interface cards in a computer. In another embodiment, a PCI bus 202 provides connectivity to an external personal computer. The PCI bus 202 couples a PCI interface block 204 in the ASIC 154 to a PCI-to-USB converter block 206 to provide a universal serial bus (USB) 208 for connection to a personal computer. Integrated circuits that implement a PCI-USB converter 206 are well-known. For example, in one embodiment, the NEC μPD720100A, USB 2.0 Host Controller may be used. In this way, the personal computer, with the use of application software, may be used to control the networking module such as to control audio channels, route audio channels to different destinations, control devices such as mixers, amplifiers and the volume on speakers, and monitor device parameters such as temperature and sound quality. Alternately, the personal computer can be used to download software to the networking module, such as the receive frame procedure, send frame procedure and signal processing procedure to the program memory 170, or directly to the instruction PAM 126. In an alternate embodiment, no PCI-USB converter block 106 is provided.

Figure 5:
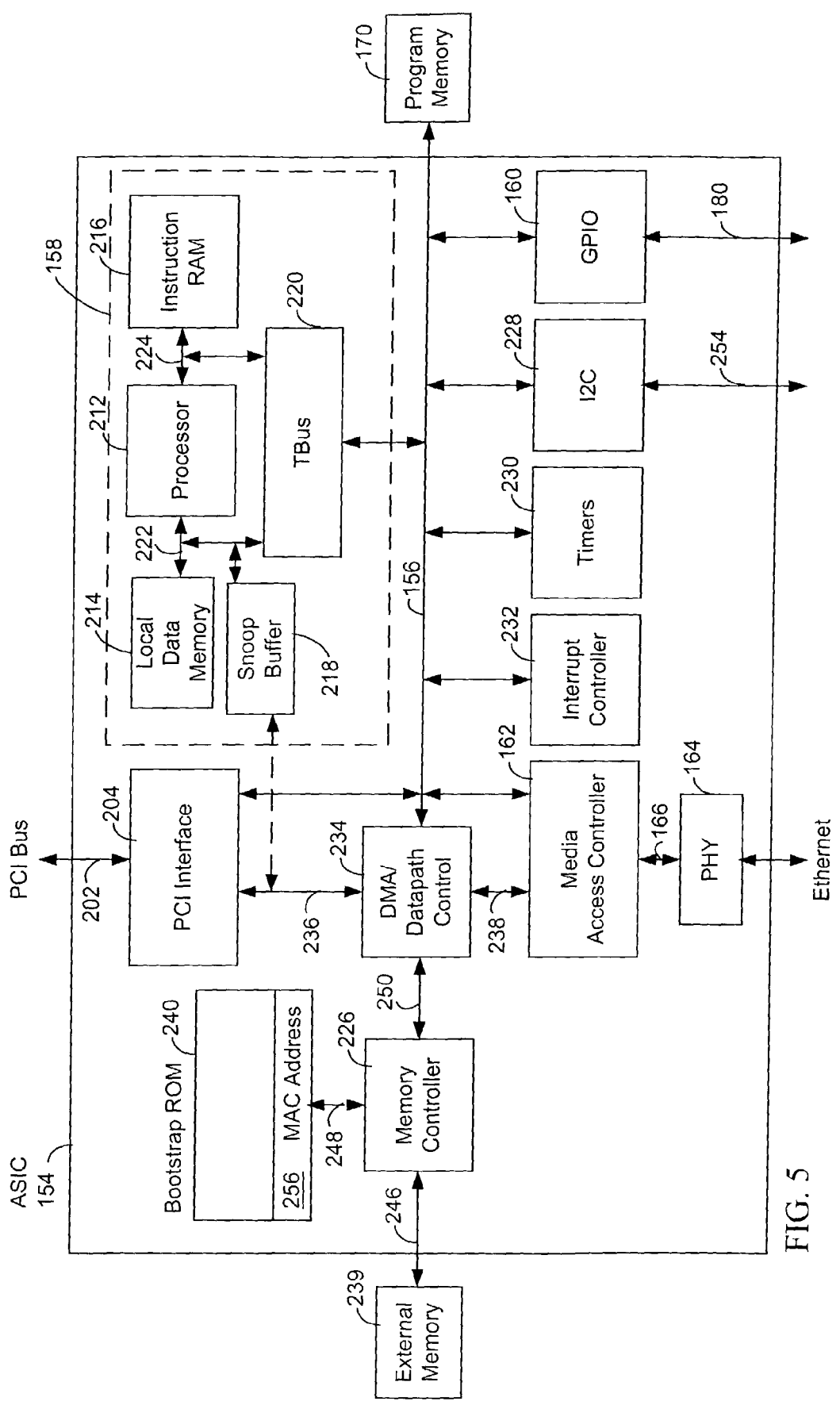
FIG. 5 depicts a block diagram of the programmable ASIC of FIG. 4.

FIG. 5 depicts a block diagram of the programmable ASIC 154 of FIG. 4. The programmable ASIC 154 has additional blocks not shown in FIG. 4. The processing system 158 has a processor 212, a random access memory (RAM) 214 for storing data (local data memory), a random access memory for storing instructions 216 (instruction RAM), a Snoop Buffer 218 and a TBus interface 220. The local data memory 214 and instruction RAM 216 are connected to the processor 212 by first and second memory busses, 222 and 224, respectively. The Tbus interface 220 couples the T-bus 156 to the first and second memory busses 222 and 224. The first memory bus 222 also couples the snoop buffer 218 to the processor 158.

In one embodiment, the processor 212 is a 32-bit ARM9 (ARM is a registered trademark of ARM Limited Company, Cambridge, United Kingdom) core and operates at 125 megahertz. The processor 212 is the T-bus master, and initiates T-bus traffic. The PCI interface 204, MAC 162 and memory controller 226 interface to the Tbus 156 as slave devices.

The GPIO interface block 160, an I2C block 228, timers 230, interrupt controller 232, MAC 162, PCI interface 204 and direct memory access (DMA)/Datapath Control block 234 are interconnected by the T-bus 156. The PCI interface 204 and the MAC 162 are also coupled, via first and second datapath busses, 236 and 238, respectively, to the DMA/Datapath control block 234.

The PCI interface 204 supports both target and bus master capabilities. The PCI interface 204 also contains DMA logic, data FIFOs, byte alignment logic and a Tbus interface.

The memory controller 226 is coupled an optional external memory 239 and a Bootstrap read-only memory (ROM) 240 to the DMA/Datapath control block 234, via first, second and third memory busses 246, 248 and 250, respectively. In one embodiment, the external memory 239 is a random access memory (RAM). The memory controller 226 performs external memory 239 and Bootstrap ROM 240 accesses, provides DMA arbitration and control, and calculates checksums on DMA data written to the external memory 239. In the memory controller 226, a memory interface provides single and burst transfers and byte write capability.

The MAC 162 interfaces to the PHY 164 via the media independent interface (MII) bus 166. The MAC 162 contains statistics registers, DMA logic, first-in-first-out (FIFO) buffers and a Tbus interface. The FIFO buffers are for transmitting and receiving frames. The DMA logic is for transferring frame data. In one embodiment, the MAC 162 implements a set of functions for IEEE 802.3 compliance including, but not limited to, transmission deferral, collision detection and CRC checking and generation. Because the frames are sent synchronously in the Magic protocol with full-duplex mode, collisions do not occur. In an alternate embodiment, because of the synchronous operation of the Magic network, the MAC 162 does not implement circuitry for transmission deferral and collision detection. Therefore, a simplified MAC 162 can be used.

The MAC 162 has two unidirectional DMA channels, one for the receive operation, that is, to move frames from the FIFO buffer in the MAC 162 into the local data memory 214, and one for the transmit operation, that is, to move frames from the local data memory 214 into the FIFO buffer of the MAC 162.

In one embodiment, frames are transferred using DMA. The transmit DMA channel controls a ring of descriptors in the local data memory 214. The transmit DMA channel contains a set of two registers corresponding to the entry on the transmit descriptor ring in the local data memory 214. The entries on the ring contain the local data memory address for the data fragment, the control information and the length of the data block. The processor 212 constructs the transmit descriptor entries onto the ring in the local data memory 214. Then the processor 212 initiates the DMA operation by updating the write pointer of the descriptor ring. Upon detecting the difference between the read and write descriptor ring pointers, the DMA Datapath Control block 234 reads parameters from the entries on the transmit descriptor ring in the local data memory 214. Subsequently, the DMA Datapath Control block 234 performs the data transfer. The DMA channel processes all descriptor entries in the ring until the read pointer is equal to the write pointer.

The receive channel utilizes the contiguous ring structure in the local data memory 214. The DMA Datapath control block 234 stores incoming frames sequentially. The start of each frame has information about the current frame, including the frame length, frame status and IP checksum. The DMA Datapath control block 234 controls the frame write pointer to the ring, and the processor 212 updates the frame read pointer. After processing each frame, the processor 212 updates the read pointer to free space for future packets. The DMA Datapath Control block 234 continuously monitors the frame read pointer to guarantee that the write pointer will not overrun the ring.

The processor 212 support logic, such as counters and timers are provided and available via the Tbus 156. To minimize Tbus routing overhead, the support logic resides in the MAC 162 and is mapped into the MAC register space. The Tbus interface 220 has a read buffer and a write buffer for the processor 212 to input data from or output data to the Tbus 156.

The inter-integrated circuit (I2C) interface block 228 is a bi-directional two-wire bus for providing control among integrated circuits. The I2C bus 254 has two bus lines—a serial data line and a serial clock line. Three registers in the I2C interface block 228 allow the processor 212 to programmatically control the I2C interface block 228. Transactions on the I2C bus 254 are controlled directly by software, such as an I2C interface procedure which is stored in the program memory 170 or instruction RAM 216. For systems with a single I2C bus master, the software performs bus transactions through direct control of the clock and data signals. One register, addressable by the processor 212, has an I2C clock bit that is coupled to an I2C clock pin. For reads, the value of the I2C clock pin is returned, rather than the state of this bit. An I2C Data register, addressable by the processing engine, is used to read and write data. One bit, called I2CData is coupled to an I2CData pin. For reads, the value of the I2CData pin is returned, rather than the state of this register.

The general purpose input-output (GPIO) block 160 is coupled to the Tbus 156 and the GPIO bus 180. The GPIO block 182 has a GPIO write register and a GPIO read register which can be written and read by the processor 212.

The bootstrap ROM 240 stores instructions to load operational code into the instruction memory 216 after a power-on reset. The bootstrap ROM 240 may also store the MAC address 256 and diagnostics. In one embodiment, the instructions in the bootstrap ROM 240 cause at least a subset of the procedures in the program memory 170 to be loaded into the instruction RAM 216.

The Snoop buffer 218 is provided to reduce the latency for accessing data structures bound for the external memory 239. The DMA/Datapath Control block 234 allows data bound for the external memory 239 to be simultaneously forwarded to the Snoop Buffer 218 via the first datapath bus 236.

The Timers block 230 has a free running timer to generate a periodic interrupt to the processor 212. The period of the interrupts can be specified programmatically via a timer register. The Timers block 230 also has a OneShot timer that counts down from a predetermined value that was loaded into a oneshot timer register. When the value of the one-shot timer register is equal to zero, the timers block 230 generates an interrupt. The value of the one-shot timer remains at zero until a new value is loaded.

The Interrupt controller 232 has an interrupt vector register and an interrupt clear register which can be read and written to, respectively, by the processing engine.

Referring back to FIG. 4, after the system is powered up, the instructions in the bootstrap ROM 240 are loaded into the instruction RAM 216. The processor 212 executes the instructions and loads the receive frame procedure 172, send frame procedure 174 and, in some embodiments, the signal processing procedure 176 into the instruction RAM 216. The receive frame procedure 172 receives incoming frames from the MAC 162. The frames may have audio signals in slots and control information. In one embodiment, the receive frame procedure 172 causes the processor 212 to load the frame, word-by-word, into the local data memory 214. Alternately, the receive frame procedure 172 causes the processor 212 to activate the DMA/Datapath control block 234 to transfer the frame from a FIFO in the MAC 162 to the local data memory 214. The receive frame procedure 172 then extracts and responds to control information addressed to the networking module in the frame. If the receive frame procedure 172 determines that the received frame contains a digital audio signal in a valid audio slot that is associated with the networking module 150, the receive frame procedure 172 causes the processor 212 to output that digital audio signal to the FPGA 152 via the GPIO interface blocks 160 and 182. The I2S block 184 of the FPGA 152 then outputs the digital audio signal, serially, to a digital-to-analog converter 194. Alternately, no digital-to-analog converter is used and an audio destination receives the digital audio signals.

The send frame procedure 174 builds an outgoing frame having a Magic packet and loads that outgoing frame into the MAC 162. In response to receiving a incoming frame, the MAC 162 sends the outgoing frame over the link, and the processor 212 builds a new frame in the local data memory 214. The I2S block 184 samples the audio signal for each channel. The I2S block 184 reads a serial digital audio signal from the A/D converter 192 for each channel and provides a parallel digital audio signal to the GPIO interface block 182 of the FPGA 152. The processor 212 causes the GPIO block 160 of the ASIC 154 to sequentially address each GPIO register that stores a parallel digital audio signal in the GPIO interface block 182 of the FPGA 152, and stores the parallel digital audio signal(s) in the associated audio slot(s) in the frame in the local data memory 214. The send frame procedure 174 causes the processor 212 to load the source and destination MAC addresses, the source device number, and the destination device number into a frame. The source MAC address is the MAC address 162 of the networking module. The destination MAC address is the source MAC address of the device that the port connects to, and is provided during network configuration. The source device number is the device number of the networking module. The destination device number is a broadcast address to all networking modules to examine the frame and extract their associated digital audio signal(s). In one embodiment, the send frame procedure 174 causes the processor 212 to load each word of the frame into a buffer in the MAC 162. Alternately, after the frame is built, the send frame procedure 174 causes the processor 212 to activate the DMA/Datapath control block 234 to transfer the frame to a FIFO buffer in the MAC 162, as described above.

In another alternate embodiment, the signal processing procedure 176 causes the digital audio signal for at least one specified audio channel to be modified as the frame is being built. In this embodiment, the send frame procedure 172 invokes the signal processing procedure 176 to modify the digital audio signals of the specified channels.

Figure 6:
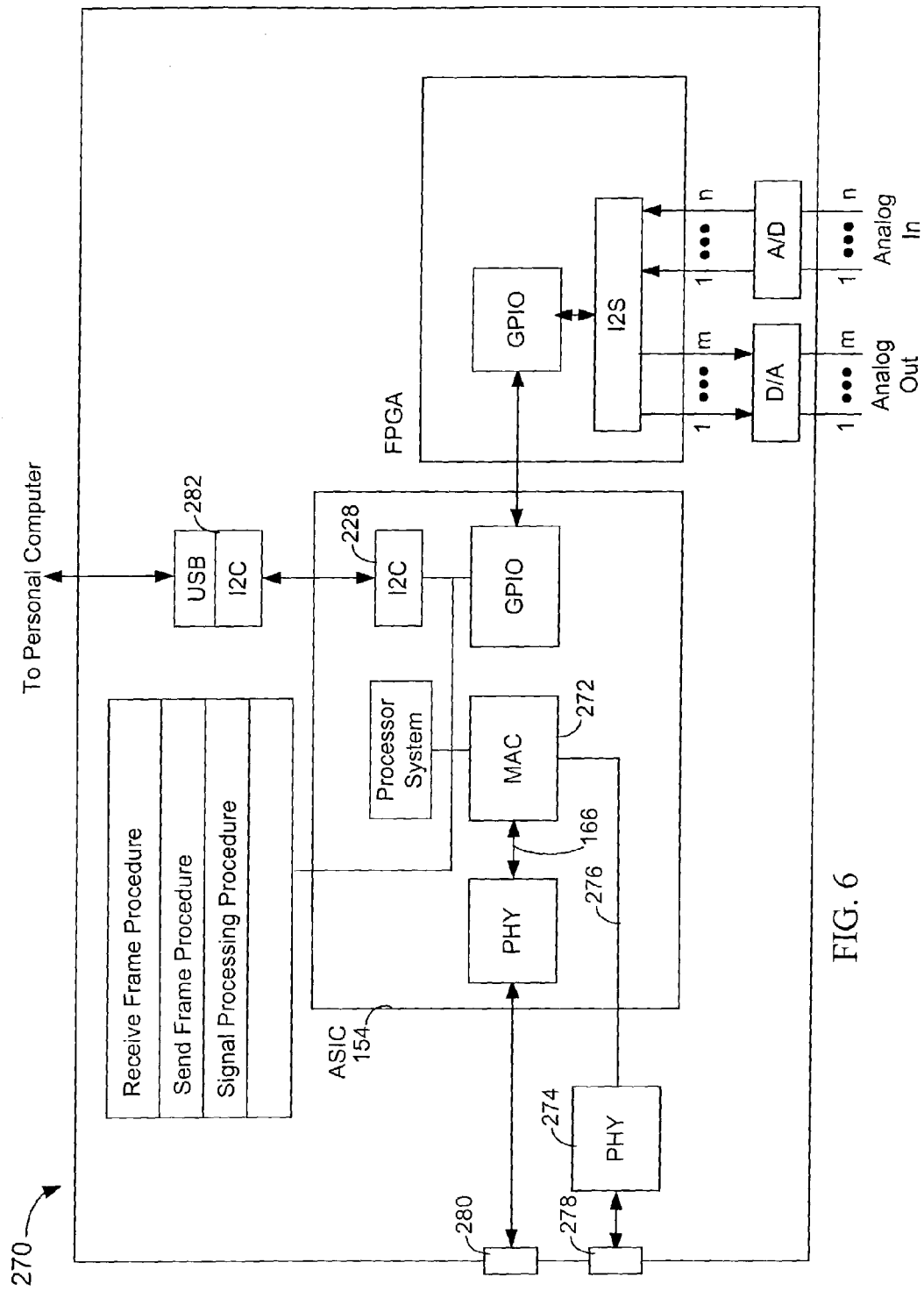
FIG. 6 depicts a block diagram of an alternate embodiment of the single-port networking module of FIG. 4 in which the networking module has a failover port.

FIG. 6 depicts another embodiment of a single-port module 270 that has a failover port. This embodiment is similar to the embodiment of FIG. 4, therefore the differences will be described. In this embodiment, the MAC 272 is coupled to a second PHY 274 via a second media-independent interface bus 276.

The output of the PHY 274 is coupled to a redundant RJ-45 connector 278. The MAC 272 has circuitry to detect when the first link failed 280, and when the link that is connected to the primary port 280 has failed, the MAC 272 switches the transmission of frames to the second PHY 274. In this embodiment, the I2C interface block 228 of the ASIC 154 is coupled to an I2C-to-USB converter block 282 to provide a USB interface to a PC, which can be used to control the networking module.

Figure 7:
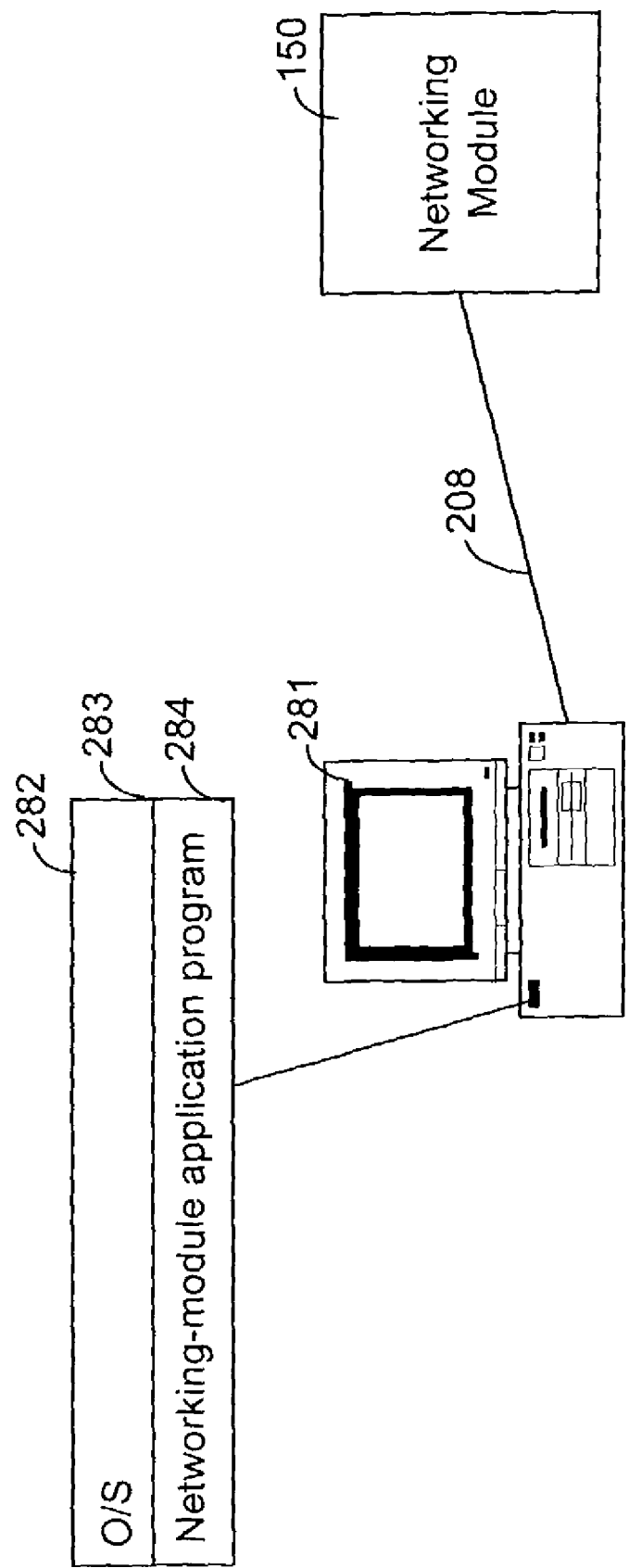
FIG. 7 depicts a high-level block diagram of a personal computer (PC) connected to a networking module.

FIG. 7 depicts a high-level block diagram of a personal computer 281 connected to a networking module 140 of FIG. 4 via a USB interface 208. The personal computer 281 has a memory 282 storing an operating system 283 and a networking-module application program 284. For example, the operating system 283 may be Microsoft Windows, Linux or Apple. The networking-module application program 284 allows a user to communicate with the networking module 150 so that the user can obtain information about all the devices in a network, control information transmitted on every frame, and in some cases the entire audio stream. The networking-module application program 284 provides a graphical user interface that can display a map of all the devices in a network, display all the audio channels received or transmitted by the networking modules. The networking-module application program 284 can also monitor information from audio devices, such as the temperature of a speaker, the audio quality, and other information regarding the frame. The user or the networking-module application program 284 can use the information to monitor and control the network devices, the audio quality, and the entire system operation.

When the network is booted up, the networking module 150 communicates information to the networking-module application 284 on the personal computer 281 about all the devices that are initialized. The networking-module application 284 uses this information to display the network topology to the user. For example, the network information may be that device 1 is an amplifier, and device 2 is a mixer. The network topology may be displayed as a set of icons, one for each device. When the user clicks on an icon, additional information about the associated device is displayed. When the networking module 150 receives a frame, the networking module 150 extracts the control information from each frame and passes that information to the networking-module application 284 in the personal computer 281 via the USB interface 208. The networking-module application 284 also has a control interpreter that can determine what the control information specifies.

A user may view, modify (set) the control information. For example, a user can change the audio channel assigned to slot 1 to slot 10, or audio channel one from device 1 to device 2. This way, a user can control the delivery of all the audio channels and control the audio systems from a single location using a personal computer 281 and the networking-module application software 284.

In some embodiments, the personal computer 281 may also act as a mixer of the audio signals, and transmit the mixed audio signals back to the audio network.

The personal computer 281 and networking-module application software 284 may be used with any of the embodiments of the networking module in this specification that have an interface to a personal computer.

Figure 8:
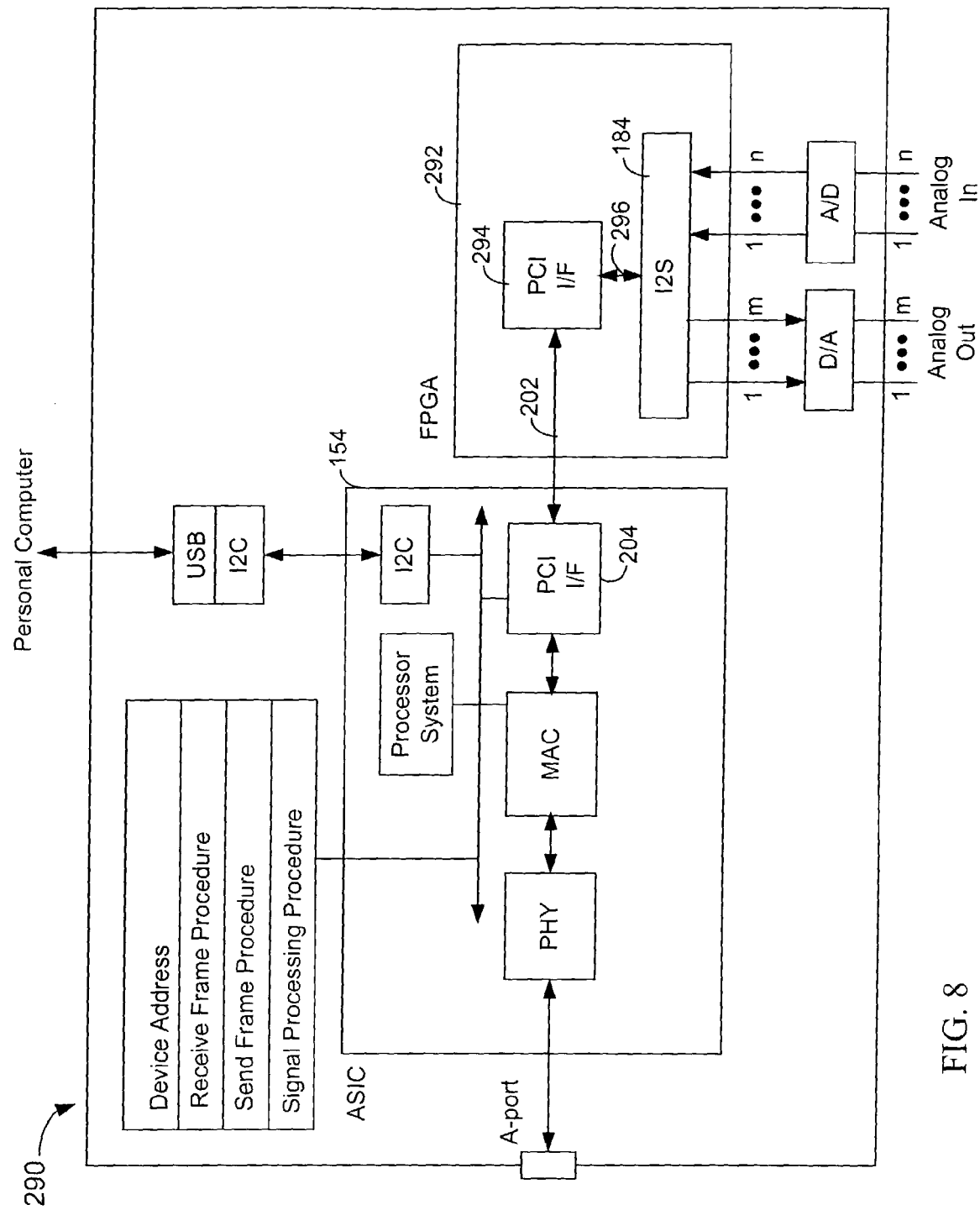
FIG. 8 depicts a block diagram of another alternate embodiment of a single-port networking module in which the ASIC and FPGA communicate using a peripheral component interconnection (PCI) interface.

FIG. 8 depicts a block diagram of another alternate embodiment 290 of the single-port module 290. This embodiment is similar to the embodiment of FIG. 4, therefore the differences will be described. In this embodiment, the PCI interface 204 in the ASIC 154 acts as a PCI master. The FPGA 292 has a PCI slave block 294 that interfaces to the PCI master 204 via the PCI bus 202. The PCI slave block 294 also interfaces to the I2S interface block 184 via a first FPGA bus 296. The PCI interface 204 can work with the DMA datapath control block 234 (FIG. 5) and transfer data across the PCI bus 202 using DMA. Therefore, the PCI interface 204 can transfer data faster than the GPIO interface 182 (FIG. 4). In an alternate embodiment, registers in the PCI interface block 294 are read individually by the processor 212 (FIG. 5).

Figure 9:
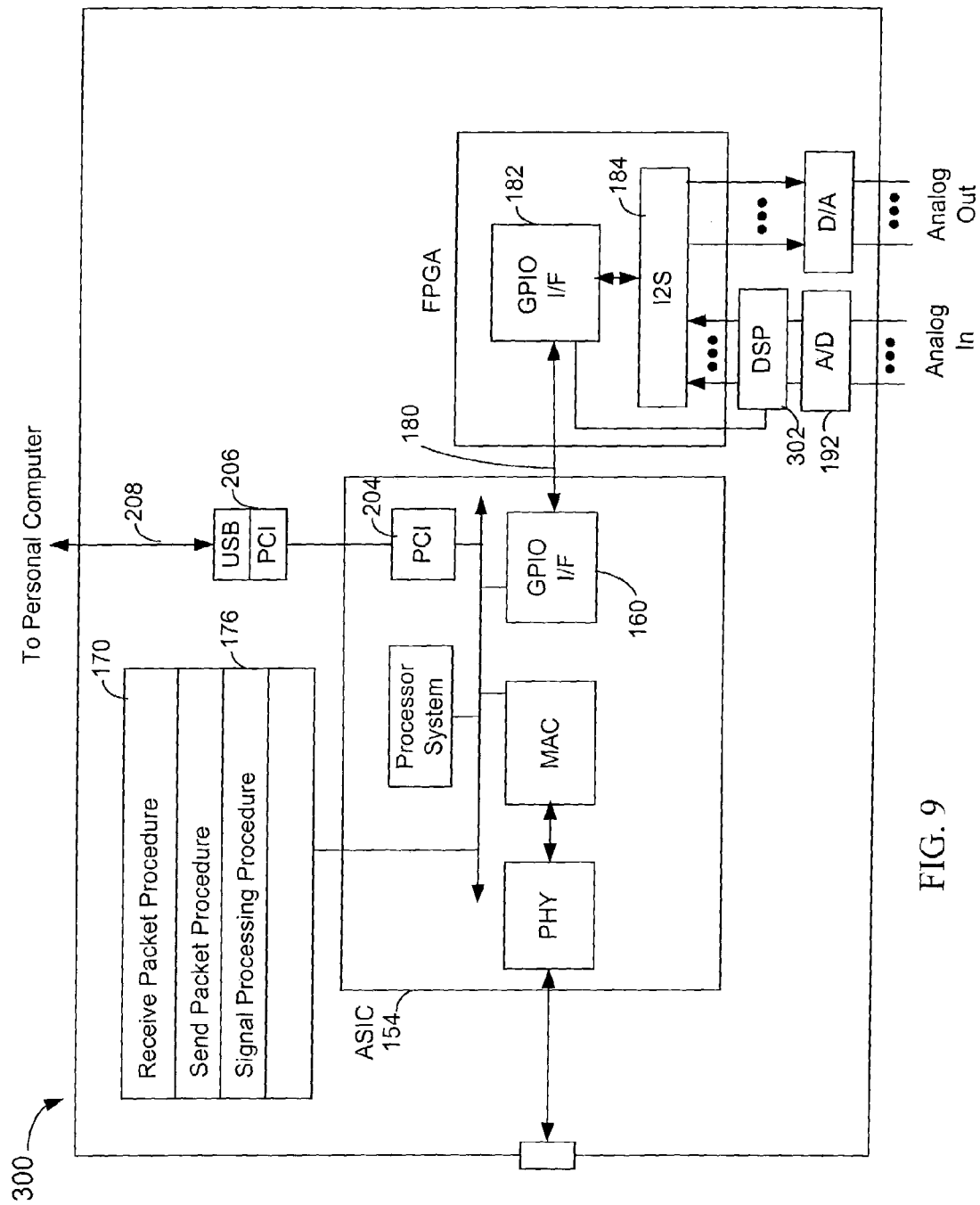
FIG. 9 depicts a block diagram of an embodiment of a single-port networking module in which a digital signal processor is coupled between an analog-to-digital (A/D) converter and an I2S interface.

FIG. 9 depicts a block diagram of another alternate embodiment of a single-port module 300. This embodiment is the same as FIG. 4 except that a digital signal processor (DSP) 302 is placed between the A/D converter 192 and the I2S interface block 184. In one embodiment, the DSP 302 is coupled to the GPIO interface 182 and can be loaded with the signal processing procedure 176 via the GPIO interface. The DSP may receive the signal processing procedure 176 from the program memory 170. Alternately, the DSP may receive a signal processing procedure from a personal computer via the USB bus 208, USB-to-PCI converter 206, and PCI interface 204.

In another alternate embodiment, the DSP 302 has an I2C interface and is connected to the I2C interface 228 (FIG. 5) of the ASIC 154, rather than being coupled to the GPIO interface block 182.

Figure 10:
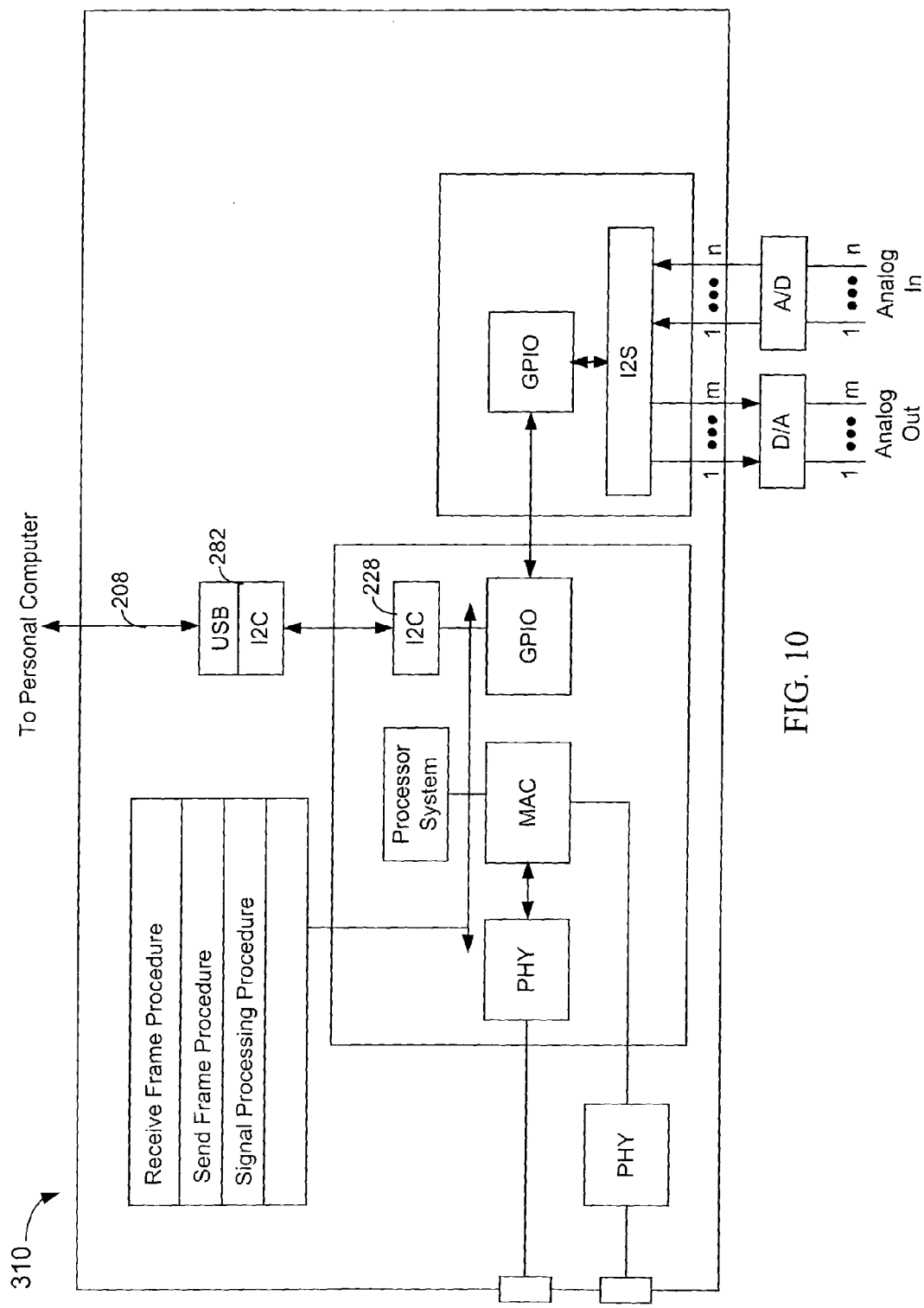
FIG. 10 depicts a block diagram of yet another embodiment of a single-port networking module in which the ASIC communicates with a personal computer connected to USB port via an I2C interface.

FIG. 10 depicts a block diagram of yet another alternate embodiment of the single-port module 310. This embodiment 310 is the same as the embodiment of FIG. 9, except that an I2C interface block 208 is coupled to an I2C-to-USB converter 282 to provide a USB bus 208 interface to a personal computer.

Single-Port Destination Module

Figure 11:
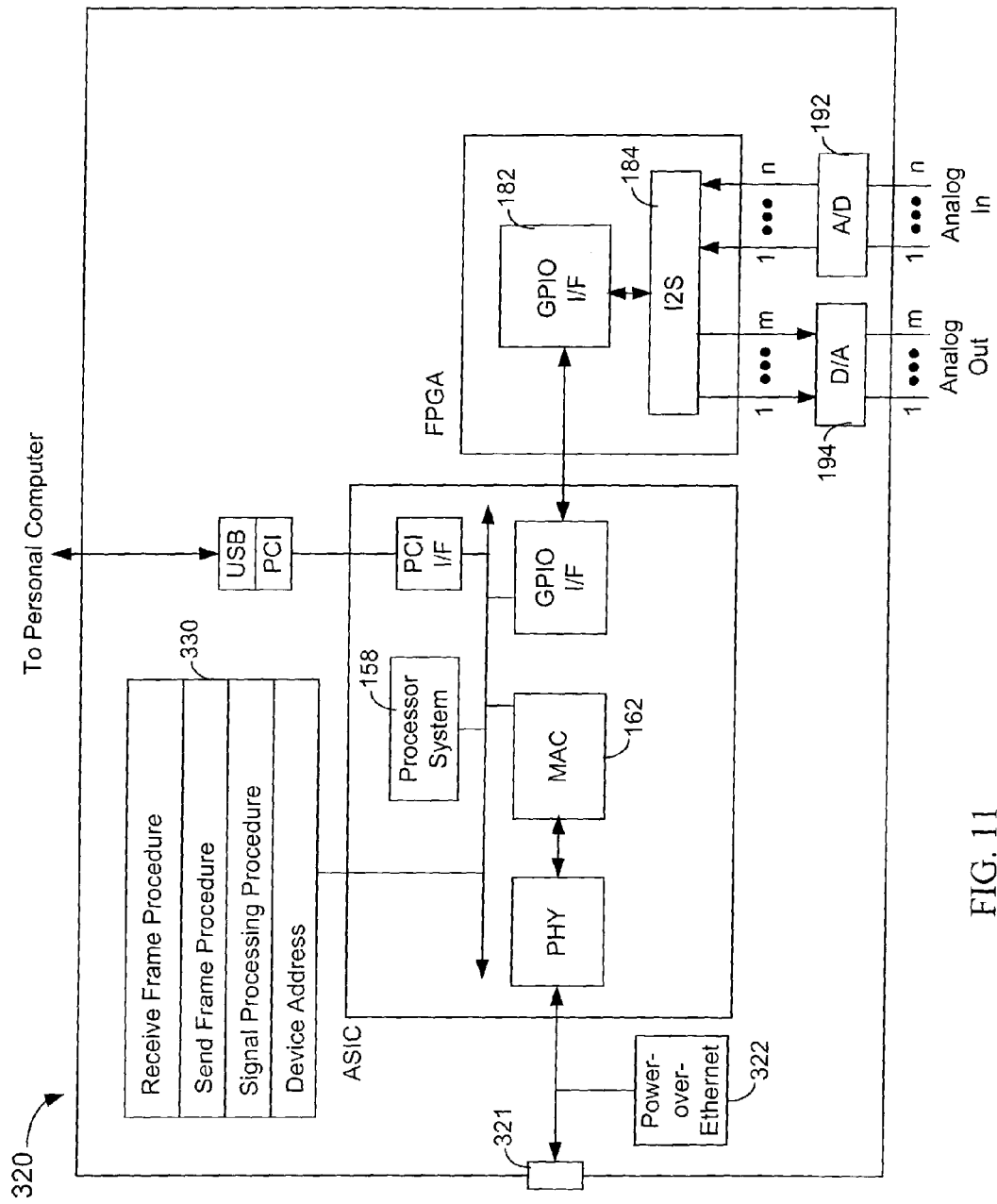
FIG. 11 depicts a block diagram of an embodiment of a single-port networking module for use with an audio destination.

FIG. 11 depicts a block diagram of an embodiment of a networking module 320 that is a single-port destination module 320. The destination module 320 can be incorporated into any device such as a musical instrument, an amplifier, headphones, speakers with a built-in amplifier, a mixer, an effects box, a CD recorder, a tape recorder, a DVD recorder, or a PC. This embodiment is the same as the networking module of FIG. 4 except that the networking module predominantly receives audio signals, and therefore the RJ-45 connector is a B-port. The I2S interface block 184 outputs digital audio signals in I2S format. In another embodiment, the networking module 320 has a digital-to-analog converter 194 to provide analog output signals that may be used with conventional audio equipment. In another embodiment, the networking module 320 may also receive serial digital audio signals in I2S format. Alternately, the networking module 320 has an analog-to-digital converter 192 to receive conventional analog audio signals.

The single-port multi-media destination module 320 may be implemented using any of the embodiments shown in FIGS. 4, 6, 8, 9 and 10 and may have a failover port. In addition, similar to the DSP of FIG. 9, a DSP may be placed between the I2S block 184 and the D/A converter 194 to apply desired effects to the digital audio signals.

In another embodiment, the networking module also has a power-over-ethernet block 322 to provide power over the ethernet. The power-over-ethernet block 322 supplies power to the RJ-45 connector 321 in accordance with the IEEE 802.3af standard for power over ethernet. In an alternate embodiment, the networking module 320 does not follow the IEEE 802.3af standard. Power is supplied over unused wires in the Category 5 cable. A predetermined DC voltage is supplied on wires 7 and 8, and ground is supplied on wires 4 and 5. U.S. Pat. No. 5,994,998, granted on Nov. 30, 1998 to Fisher et al describes supplying power over an ethernet and, is incorporated herein by reference. The power-over-ethernet block 322 may be used with any of the embodiments shown in FIGS. 4, 6, 8, 9 and 10.

In a single-port destination module, when the networking module 320 is the system timing master, a send frame procedure 330 sends a timing frame that is broadcast to all devices, every 20.84 microseconds. In the processor system 158, Interrupts can be configured to be triggered every 20.84 microseconds, and the send frame procedure 330 can cause the MAC 162 to send a timing frame in response to the interrupt.

Figure 12A:
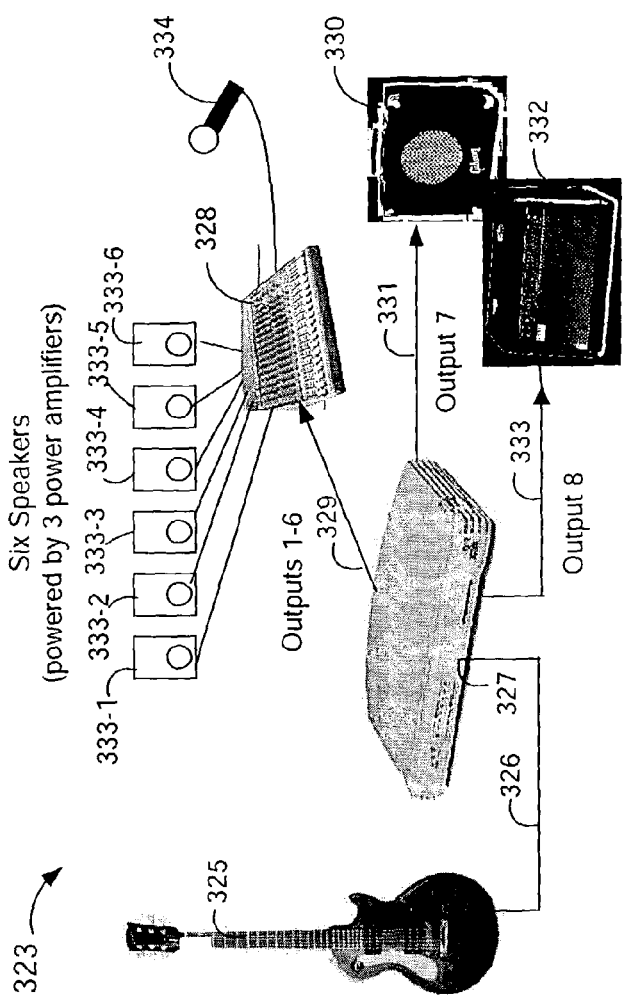
FIG. 12A depicts an exemplary audio system using a break-out box using a networking module of the present invention.

Referring to FIG. 12A, an exemplary audio system 323 using a break-out box 324 is shown. A break-out box 324 allows ethernet enabled musical instruments to connect to existing analog audio equipment such as an amplifier. More particularly, the break-out box 324 receives incoming ethernet frames, converts the digital audio signals in the frames to analog signals, and outputs the analog signals. The break-out box 324 allows legacy amplifiers and mixers that do not have digital connectivity to connect to networked devices. In FIG. 12A, a digital guitar 325 outputs digital audio signals in frames using the Magic protocol over link 326 to the break-out box 324. The link 326 is a Category 5 cable with RJ-45 connectors at each end. The link 326 is connected to an A-port 327 on the break-out box 324. The A-port is an RJ-45 connector. The break-out box 324 supplies the analog audio signals from channels 1 to 6 to the mixer 328 via cable(s) 329, supplies an analog audio signal from channel 7 to an electric guitar amplifier 330 via cable 331, and supplies an analog audio signal from channel 8 to an acoustic guitar amplifier 332 via cable 333. A microphone 334 is also connected to the mixer 328. The mixer 328 supplies analog audio signals to the six speakers 336, which are powered by 3 integral power amplifiers.

Figure 12B:
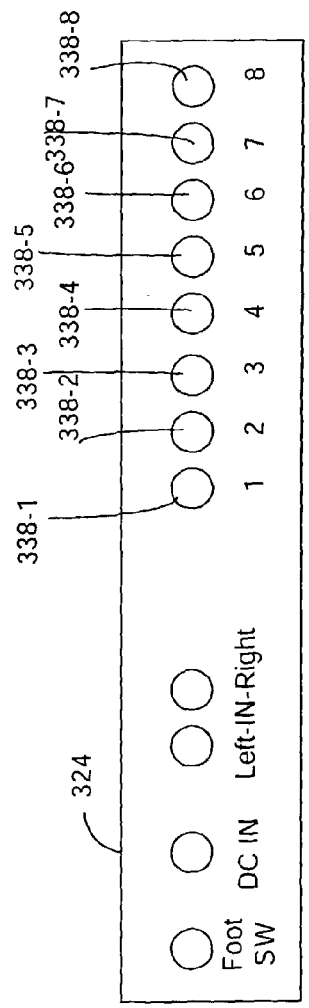
FIG. 12B depicts a rear view of the break-out box of FIG. 12A.

Referring to FIG. 12B, a rear view of the break-out box 324 of FIG. 12A is shown. The break-out box 324 has audio jacks 338-1 to 338-8, to connect to legacy analog audio equipment. Audio jacks 338-1 to 338-8 correspond to digital audio channels 1 to 8, respectively. In one embodiment, the break-out box 324 has a single-port destination module in accordance with any of the embodiments of the networking module described above. The networking module in the break-out box 324 receives frames and outputs at least a subset of the digital audio signals from the audio slots in the frames. The networking module 324 in the break-out box also has a digital-to-analog converter that converts at least a subset of the digital audio signals in the audio slots to a respective subset of analog audio signals, and outputs the subset of analog audio signals. In the break-out box 324, the networking module has a B-port and can be a system timing master. In an alternate embodiment, the break-out box 324 supplies power to the guitar 325 over the link 326 using any of the embodiments described above. In yet another embodiment, the networking module in the break-out box 324 both transmits and receives analog audio signals.

In another embodiment, the networking module has an architecture similar to that shown in FIG. 4 and outputs eight channels and receives two channels of analog audio signals.

Dual-Port Modules

Figure 13:
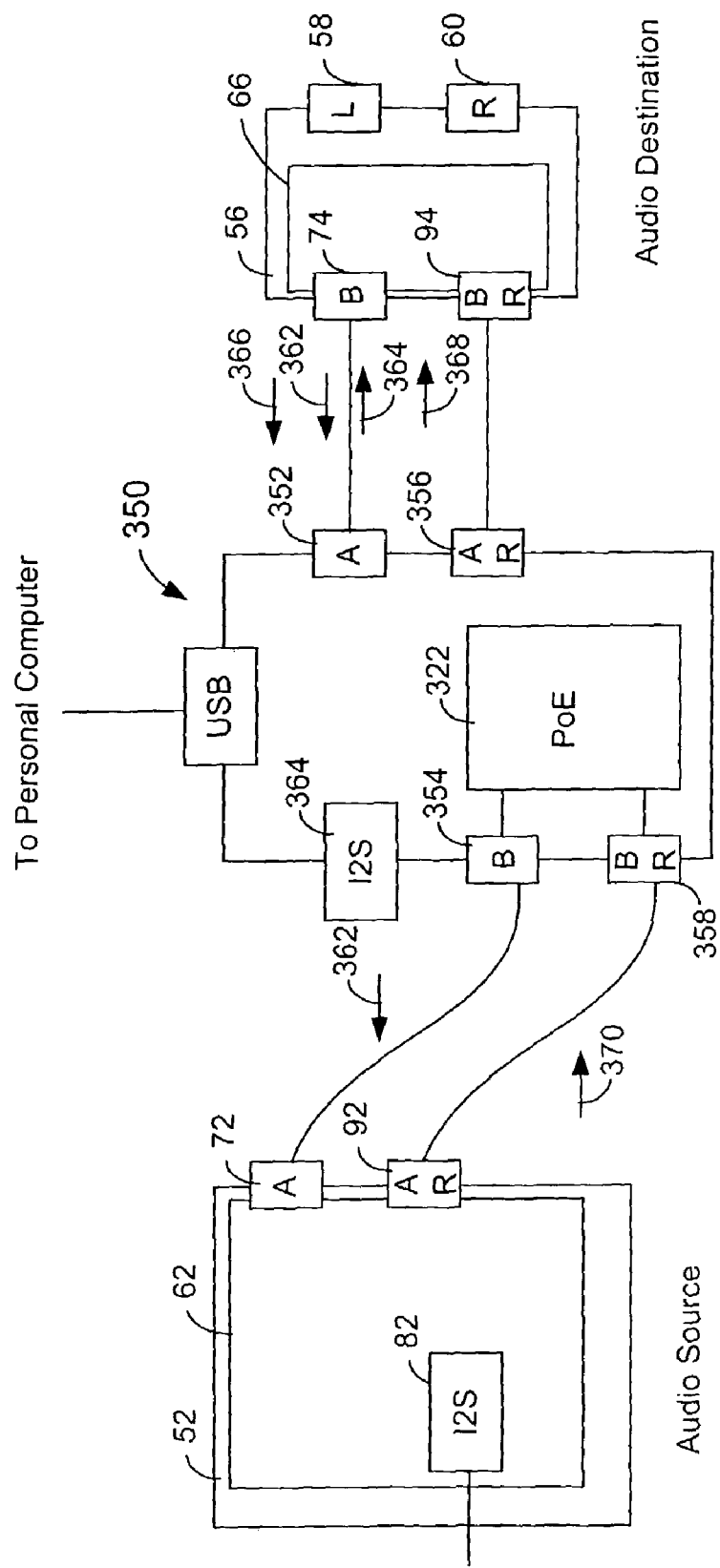
FIG. 13 depicts a high-level block diagram of a device having a two-port networking module box connected between an audio source and an audio destination.

FIG. 13 depicts a high-level block diagram of a two-port module 350 that is coupled to the networking module 62 in the audio source 52 and to the networking module 66 in the audio destination 56. In the networking module 350, a first block receives a serial digital media signal, and provides a parallel digital media signal based on the serial digital media signal. The first block is operatively coupled to a first port to receive a first incoming frame. A second block, operative with the first block, stores the parallel digital media signal in a slot in the first incoming frame to produce a combined frame, and sends the combined frame to a second port in accordance with the frame timing requirements of the media transport protocol, such as when a timing frame is received.

The two-port module has both an A-port 352 and a B-port 354. In this embodiment, both the A-port 352 and the B-port 354 have failover ports, AR and BR, 356 and 358, respectively. In an alternate embodiment, failover ports are not provided. In yet another alternate embodiment, either the A-port 352 or the B-port 354 has a failover port. The two-port module has a PoE block 322 to supply power over the ethernet to the audio source 52. In an alternate embodiment, the two-port module 350 does not have a PoE block 322. The two-port module 350 may be used in both audio source and audio destination modules, 62 and 66, respectively.

In one embodiment, the destination module 66 is the system timing master and generates the timing frames every 20.84 microseconds. For example, the destination module 66 sends a first timing frame 362 to the two-port module. In response, the two-port module sends a frame 364 to the destination module 66. The two-port module 350 may also receive digital audio signals from the first timing frame 362. The two-port module 350, using a send frame procedure, also builds a first outgoing frame that contains digital audio signals, received from the first timing frame or an I2S interface, in their associated slots.

After 20.84 microseconds, the destination module 66 sends a second timing frame 366 to the two-port module 350. In response, the two-port module 350 sends the first outgoing frame 368 to the destination module 66. The two-port module 350 also forwards the first timing frame 362 to the single-port module 62 in the audio source 52. Meanwhile, the networking module 62 in the audio source has built a frame having a subset of audio slots populated with the associated digital audio signals from its channels to provide a second outgoing frame. In response to receiving the first timing frame 362, the networking module 62 in the audio source sends the second outgoing frame 370 to the two-port module 350.

When the two-port module receives the second outgoing frame, the send frame procedure of the two-port module populates its digital audio signals in associated slots in the second outgoing frame. When a third timing frame is received, the two-port module 350 sends the second outgoing frame to the destination module. In this way, the process repeats every 20.84 microseconds when the destination module 66 sends a new timing frame. Frames sent by the two-port module 350 to the destination module 66 will contain the digital audio signals from the audio source 52 and the digital audio signals populated by the two-port module 350. The digital audio signals from the audio source 52 and the two-port module 350 are associated with different slots and can therefore be transported in the same frame. Alternately, the digital audio signals from the audio source 52 and the two-port module 350 may be combined using signal processing procedures specified by the user.

In an alternate embodiment, the two-port module 350 is the system timing master. In this embodiment, the two-port module supplies a first timing frame on the B-port towards the audio source 52. The timing frame is populated with digital audio signals generated by the two-port module 350. In response to receiving the first timing frame, the networking module 62 in the audio source sends a frame to the two-port module 350. The two-port module 350 then builds a combined frame with the digital audio signals in the audio slots associated with the audio source, the digital audio signals in the audio slots associated with the destination device, if any, and any digital audio slots associated with the two-port module 350. After the predetermined about of time between timing frames has elapsed, the two-port module 350 sends the combined frame as a timing frame to the audio destination. The two-port module 350 also sends a second timing frame to the audio source 52.

When the networking module 66 in the audio destination 56 receives the timing frame, the networking module 66 sends an outgoing frame to the two-port module 350. Depending on the audio destination, the outgoing frame may or may not have any audio slots populated with digital audio signals associated with the audio destination.

The two-port module 350 receives the outgoing frame from the audio destination 56 and populates the audio slots associated with the two-port module 350 with digital audio signals, if any. This frame will be used as the next timing frame to be sent to the audio source. In this way, the process repeats every twenty microseconds, and the digital audio signals are forwarded to all networking modules.

Figure 14:
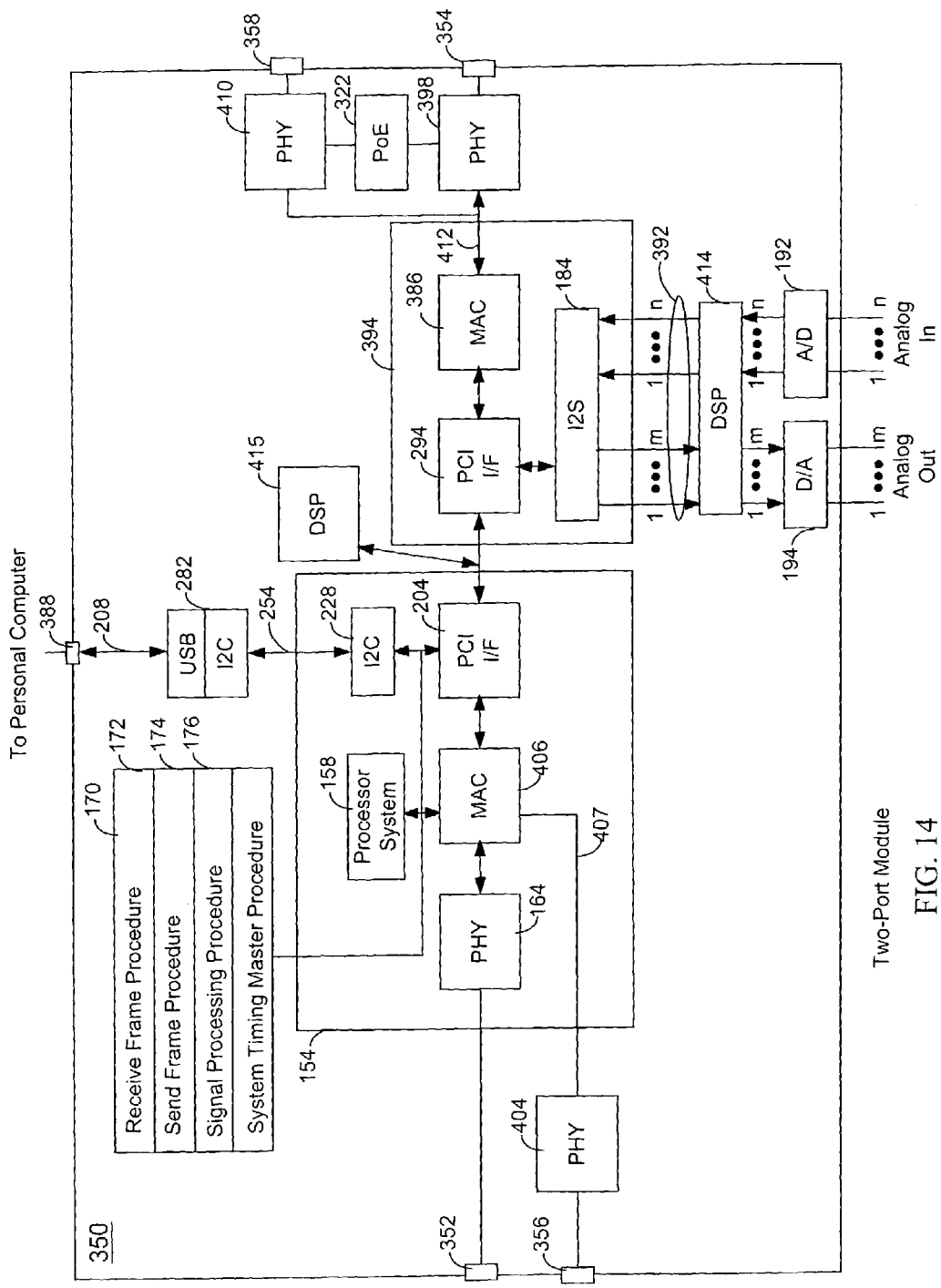
FIG. 14 depicts a block diagram of an embodiment of a two-port networking module having A and B ports, redundancy ports, an I2S interface, and a USB interface.

FIG. 14 depicts a block diagram of an embodiment of the two-port networking module 350 of FIG. 13. The two-port module 350 has an A-port 352 and a B-port 354, a USB interface 388 and an I2S interface 392. In this embodiment, the I2C interface 228 is coupled to an I2C-to-USB converter block 282 via the I2C bus 254. The I2C-to-USB converter block 282 provides a USB bus 208 to connect to a USB port 388 to connect to a computer and allows a user to control the networking module.

The two-port module 350 of FIG. 14 is similar to the single-port module 290 of FIG. 8, except that additional circuitry is provided to implement the second port 354 and the send frame procedure 174 is modified to combine the digital audio signals in their associated slots from a received frame at a A- or B-port with the digital audio signals from the I2S interface block 184, and extract associated digital audio signals from the A- or B-port frame and output them via the I2S interface block 184. The I2S interface block 184 outputs the extracted digital audio signals serially, in I2S format, to the I2S interface 392.

The FPGA 394 also has a MAC block 396 which connects to a PHY 398 via a media independent interface bus 400 as described above. In another embodiment of the invention, a power over ethernet module (PoE) 322 is coupled to the PHY 398 to supply power to an external device as described above.

In one embodiment, the ASIC 154 implements a B-port and the FPGA 394 is coupled to an A-port. Alternately, the ASIC implements an A-port and the FPGA implements a B-port. In another alternate embodiment of the invention, a failover port 356 is provided. Another RJ-45 connector 356 is coupled to second PHY 404 which is coupled to the MAC 406 via a media independent interface bus 407. In this embodiment, the MAC 406 has logic to monitor whether the primary connector 352 no longer supplies frames and automatically switches sending frames to the second PHY 404.

In another embodiment, the other port 354 also has failover capability. A second PHY 410 is connected to the MAC 396 via a media-independent interface bus 412. The MAC 396 has failover circuitry which determines when to switch over to the redundant connection. In another embodiment, the PoE block 322 is responsive to a signal from the PHY 398 to provide power via the redundant PHY 410, instead of the original PHY 398.

In another embodiment, the PoE block 322 is not used. In another embodiment, only one of the ports has a redundant connector and PHY.

In another embodiment, a DSP 414 is coupled between the I2S interface and the analog-to-digital converter 192 and the digital-to-analog converter 194. The DSP 414 may apply effects to the incoming or outgoing digital signals. A program can be downloaded from a host computer via the USB 388, or alternately, from the program memory 170. The DSP 414 can then execute that program as the digital signals are transmitted or received. In another alternate embodiment, a DSP 415 may be coupled to the PCI and to process the digital signals.

In an alternate embodiment, the networking module does not have an A/D or D/A converter.

Figure 15:
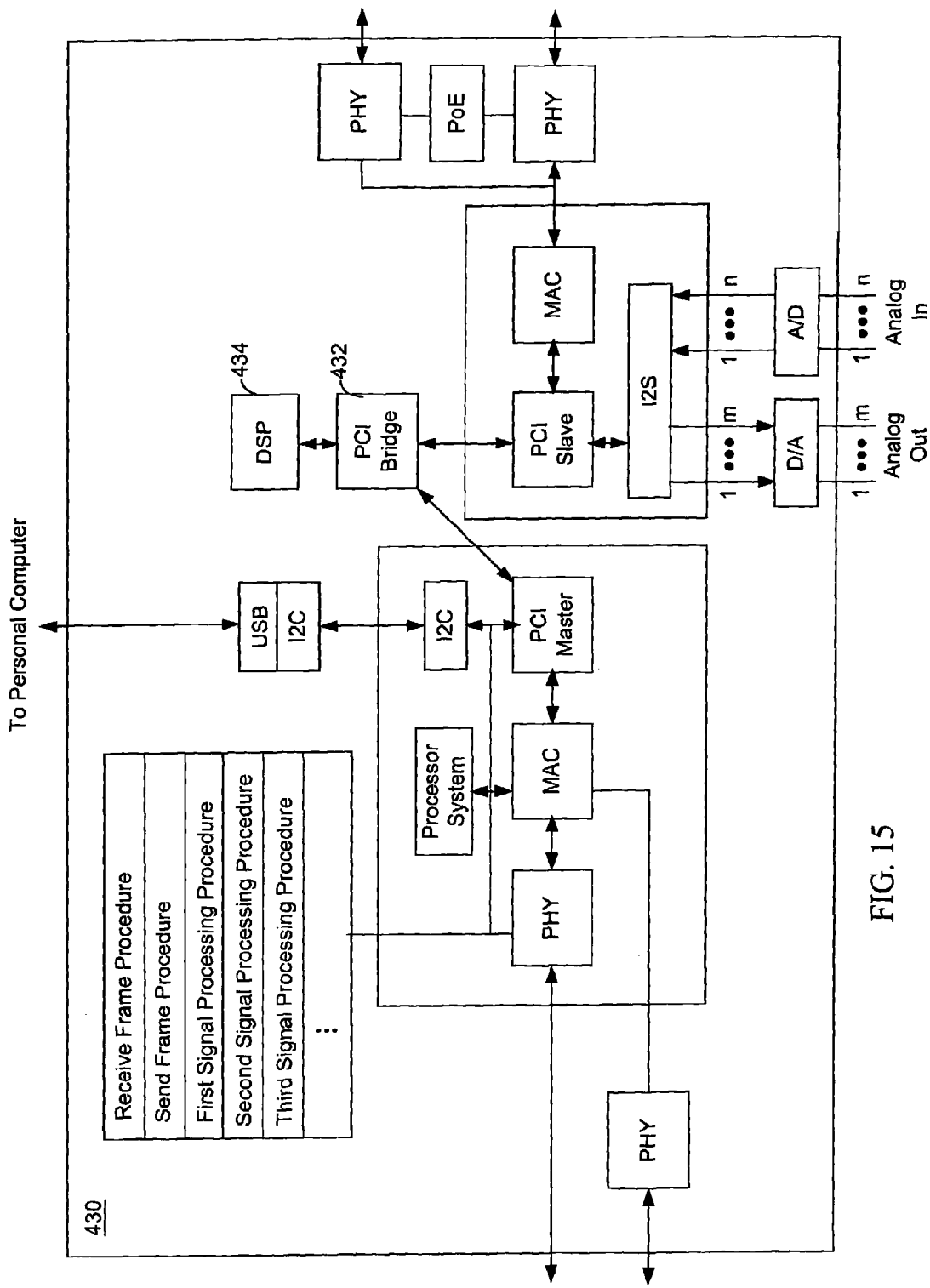
FIG. 15 depicts a block diagram of another embodiment of a two-port networking module in which a PCI bridge couples the FPGA to a media access controller.

FIG. 15 depicts a block diagram of an embodiment of a two-port networking module 430 having A and B ports, redundancy ports, an I2S interface, and a USB interface. This embodiment is similar to FIG. 14 except that a PCI bridge 432 is added. In an alternate embodiment, a DSP 434 may be coupled to the PCI bridge 432 to modify the digital audio signals on specified channels.

Figure 16:
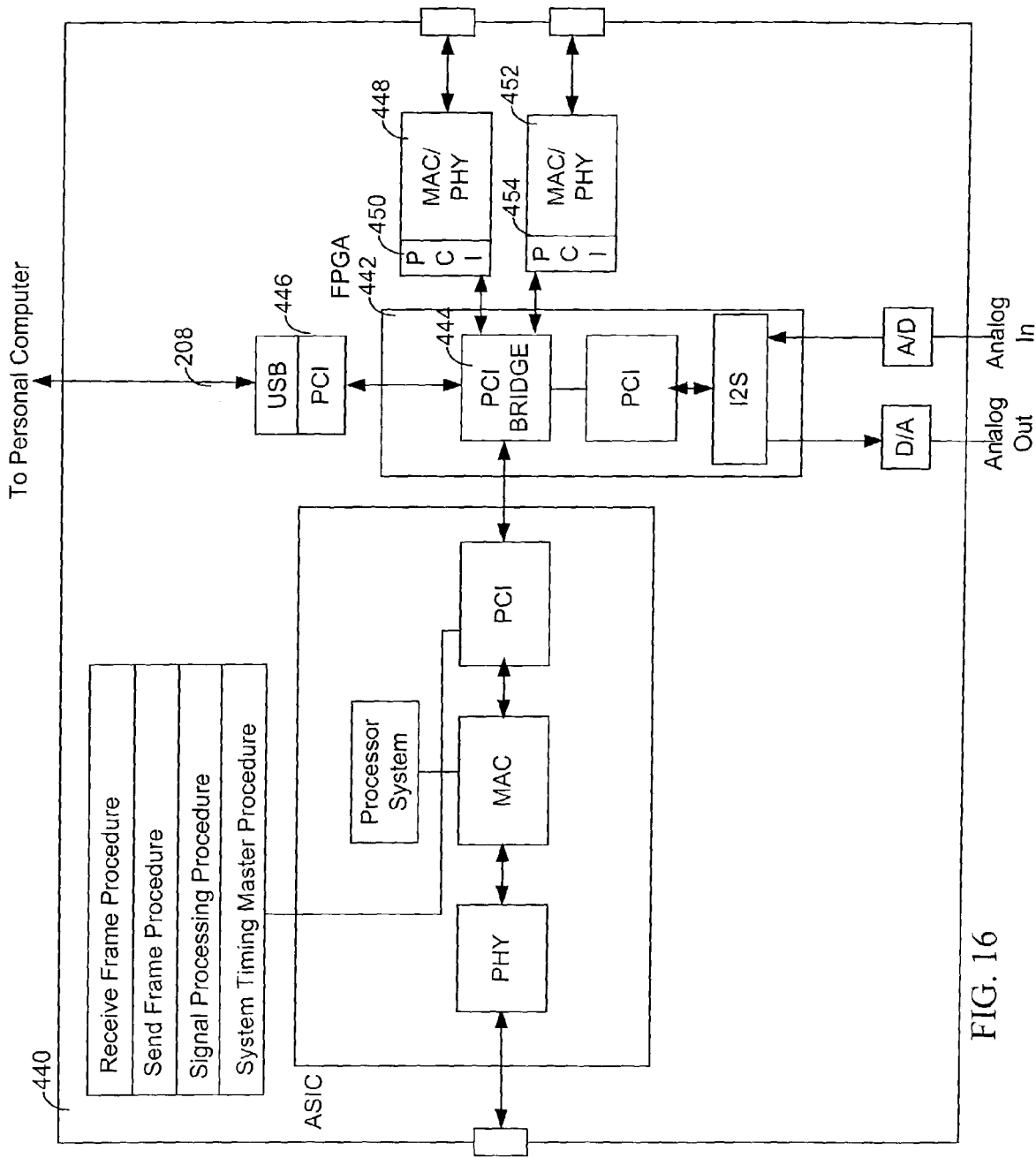
FIG. 16 depicts a block diagram of another alternate embodiment of a two-port networking module in which a PCI-to-USB converter block is coupled to a PCI bridge to provide a USB interface.

FIG. 16 depicts a block diagram of another embodiment 440 of a two-port networking module in which the FPGA 442 has a PCI bridge 444 that couples a PCI-to-USB converter block 446 to provide a USB interface 208 to communicate with a PC. The PCI bridge 444 also interfaces to a MAC/PHY 448, with a PCI interface 450 to provide a port. Alternately the PCI bridge 444 also interfaces to a second MAC/PCI 452, with a PCI interface 454, to provide a failover port.

Figure 17:
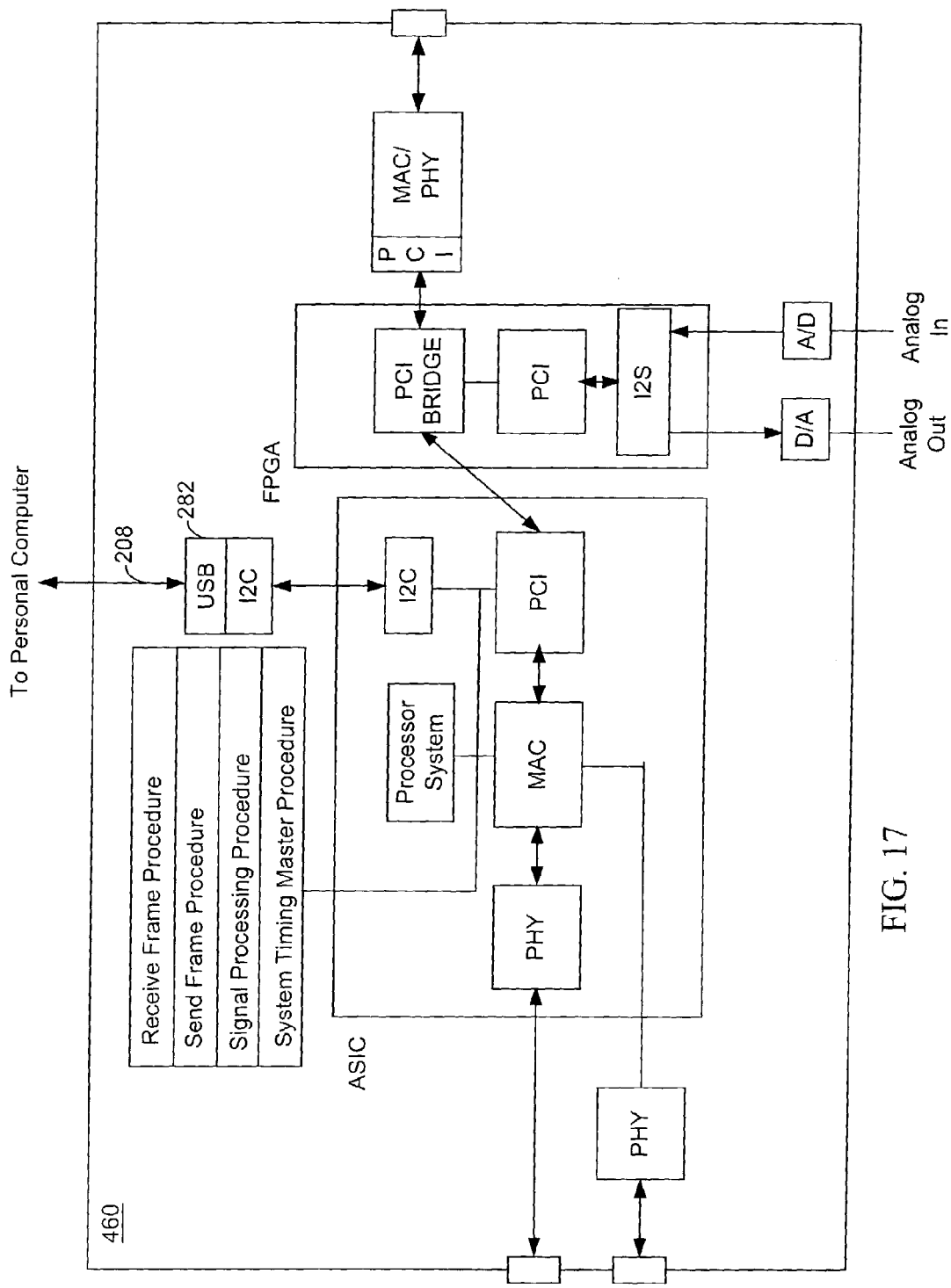
FIG. 17 depicts a block diagram of yet another embodiment of a networking module in which an I2C interface of the ASIC is coupled to an I2C-to-USB converter block to provide a USB interface.

FIG. 17 depicts a block diagram of another embodiment of a two-port networking module 460 in which an I2C-USB block 282 provides a USB interface 208 to communicate with a PC.

Figure 18:
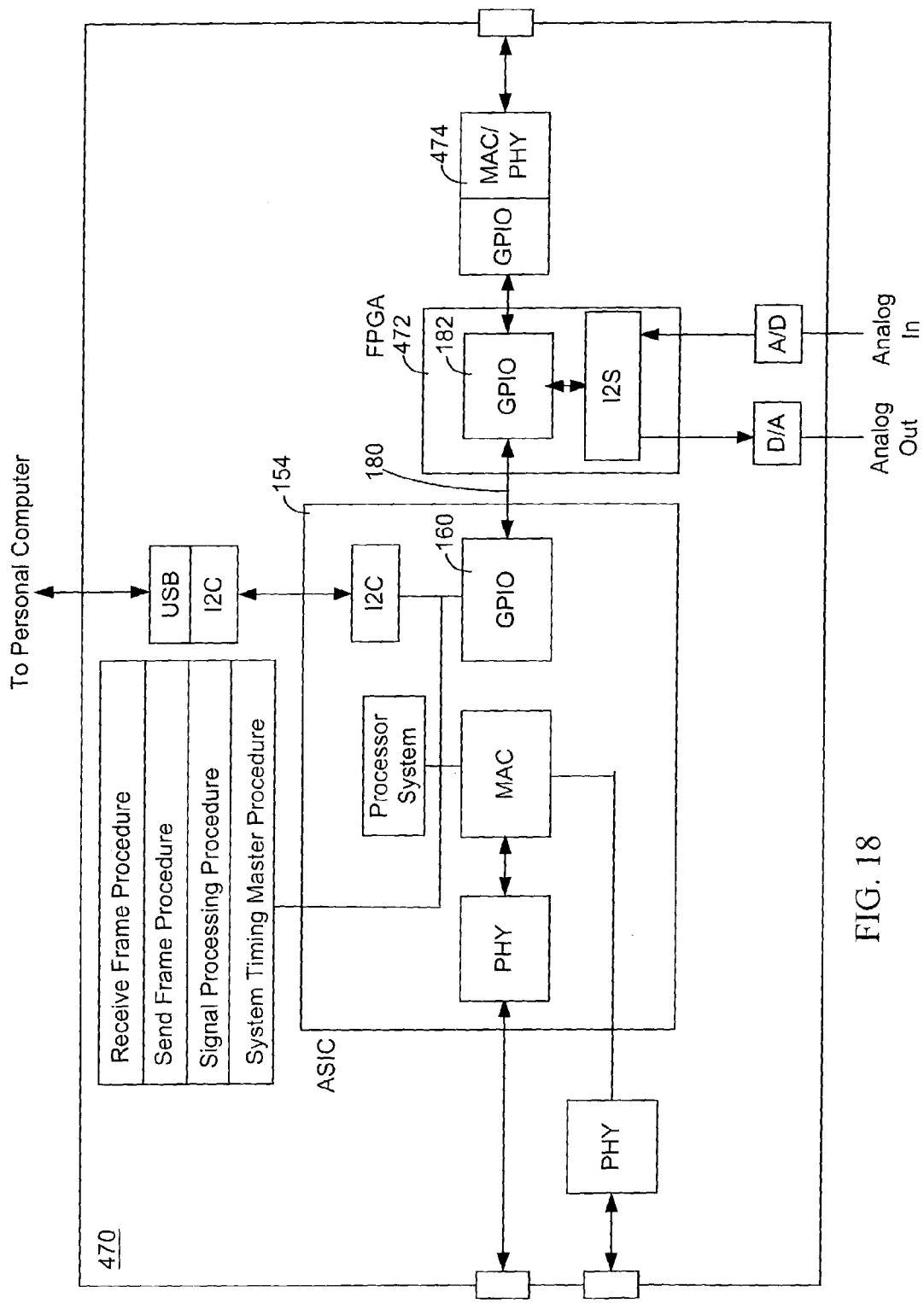
FIG. 18 depicts a block diagram of yet another embodiment of a two-port networking module in which a general purpose input-output (GPIO) interface couples the ASIC and FPGA.

FIG. 18 depicts a block diagram of yet another embodiment of a two-port networking module 470 in which GPIO interfaces 160 and 182 couple the ASIC 154 and FPGA 472, respectively, via the GPIO bus 180. The GPIO interface 182 in the FPGA 472 is also coupled to a MAC/PHY 474 to provide a B-port.

Figure 19:
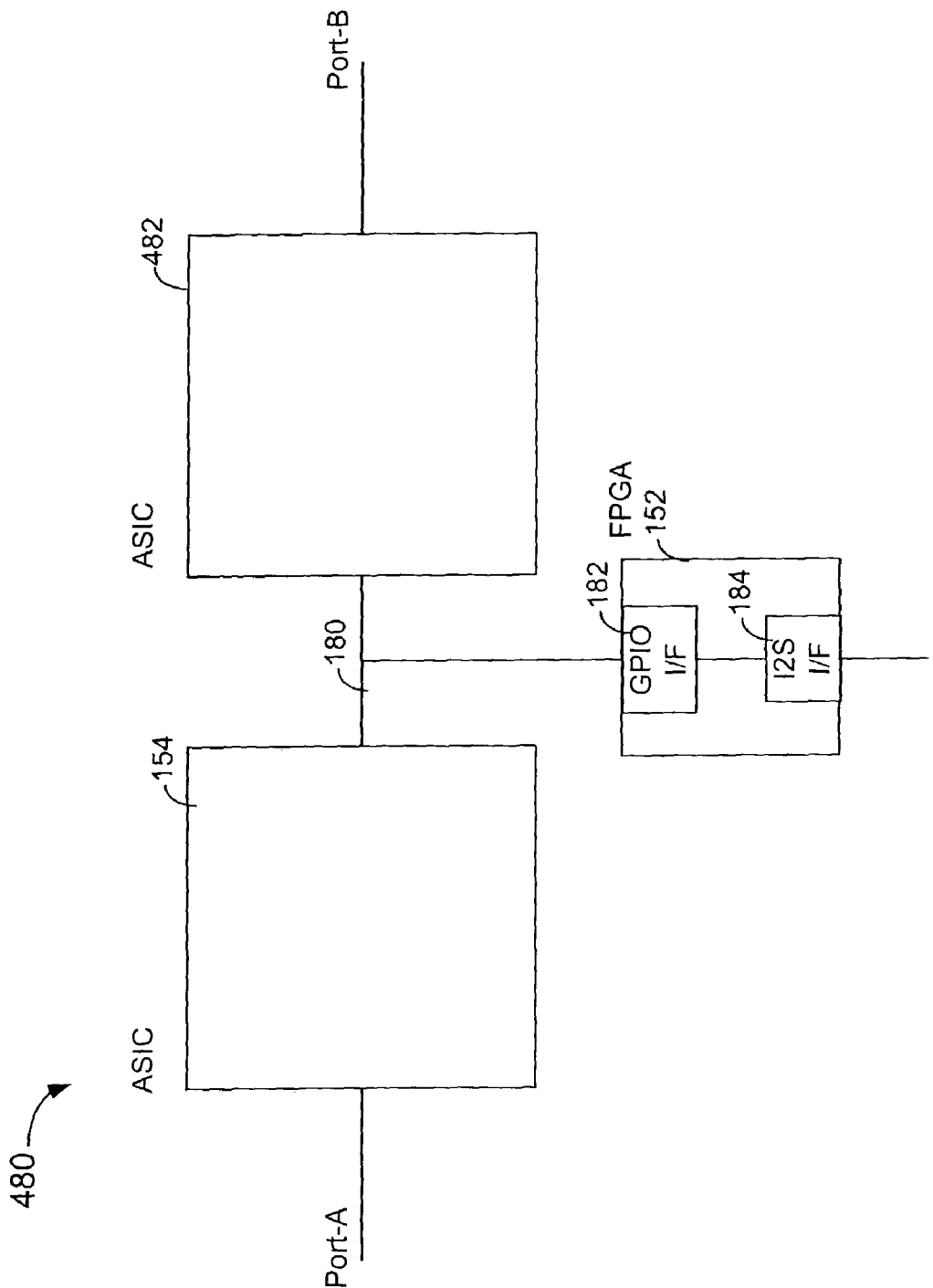
FIG. 19 depicts a block diagram of an embodiment of a two-port networking module that interfaces two ASICs using a GPIO interface.

FIG. 19 is a block diagram of another alternate embodiment of the two-port networking module 480 in which a first ASIC 154 is coupled to a second ASIC 482 over the GPIO bus 180. The second ASIC 482 is a slave to the first ASIC 154 and provides an interface to the B-port. The FPGA 152 is also coupled to the GPIO bus 180. The FPGA 152 has a GPIO interface block 182 which communicates with an I2S interface block 184, as described above.

Figure 20:
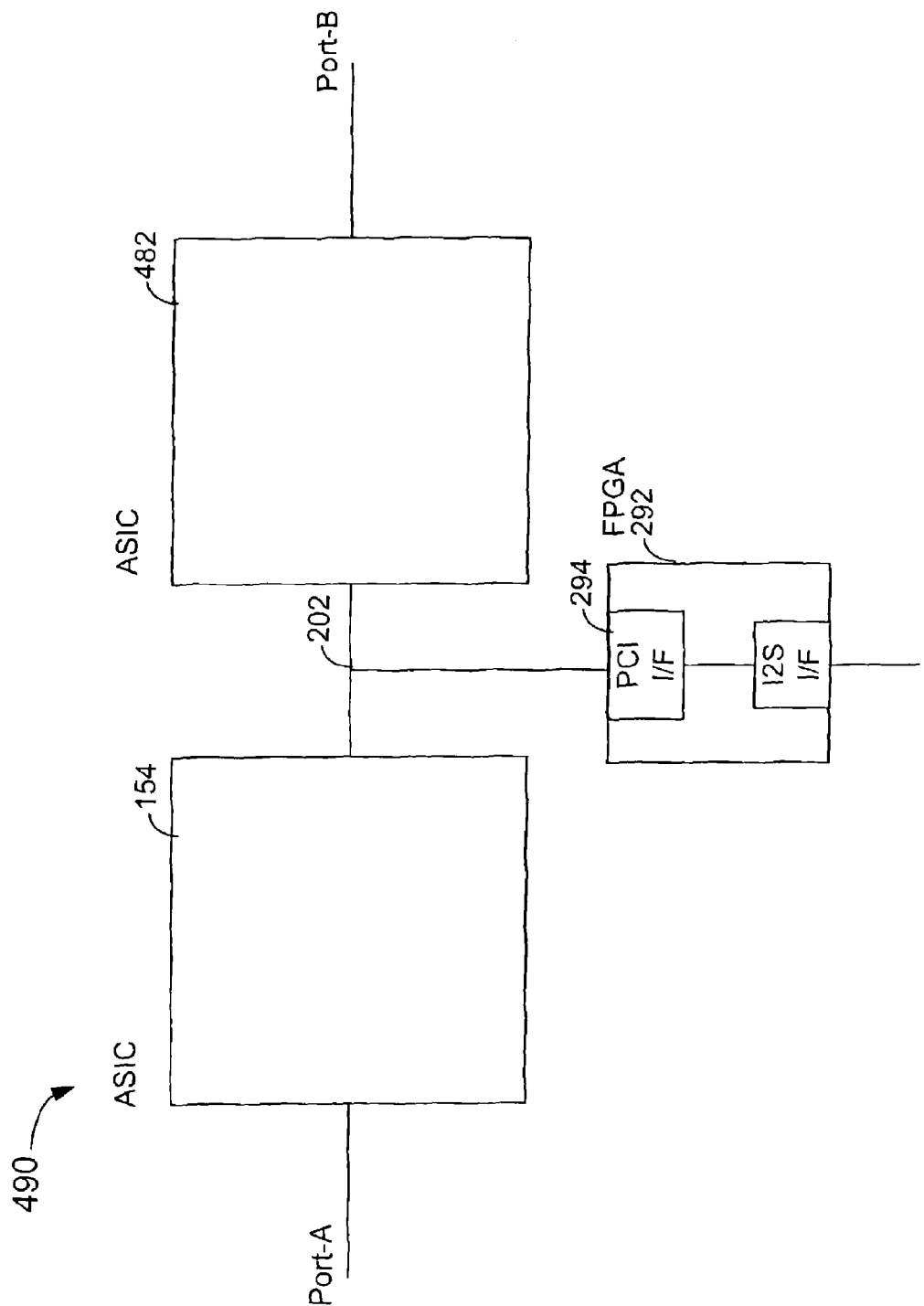
FIG. 20 depicts a block diagram of an alternate embodiment of a two-port networking module in which a PCI bus interfaces two application specific integrated circuits (ASICs) and a field-programmable gate array (FPGA)

FIG. 20 is a block diagram of a yet another alternate embodiment of a two-port interconnect module 490. The two-port networking module 490 of FIG. 20 is the same as the two-port networking module 480 of FIG. 19 except that a PCI bus 202 couples the first and second ASICs, 154 and 482, and the FPGA 292. The FPGA 292 also has a PCI interface 294.

Figure 21:
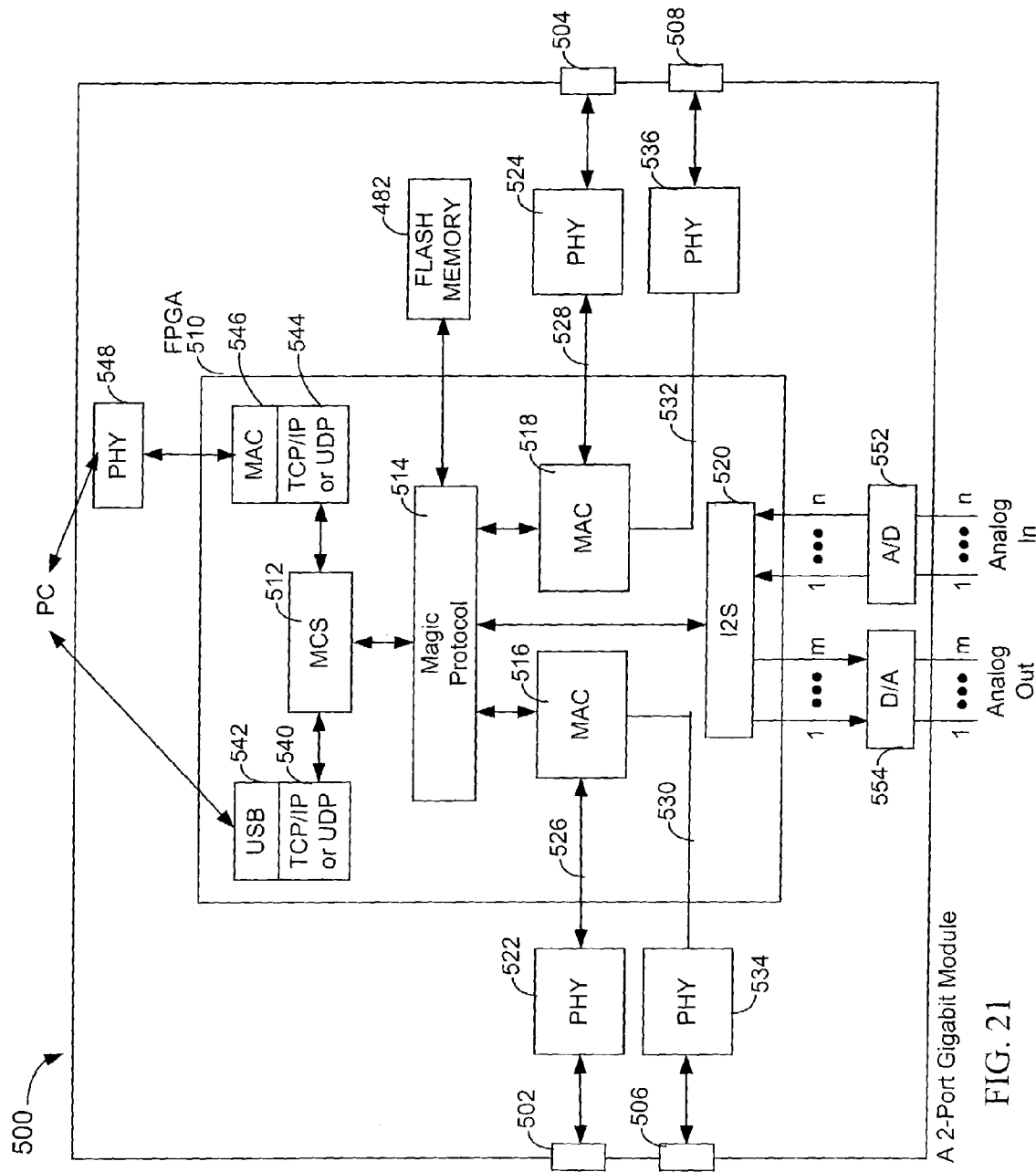
FIG. 21 depicts a block diagram of an embodiment of a two-port networking module that operates at one gigabit.

FIG. 21 depicts a block diagram of an embodiment of a two-port gigabit networking module 500. In this embodiment, first and second ports, 502 and 504, each has a failover port, 506 and 508, respectively. An FPGA 510 has a Magic Control System (MCS) block 512 that is coupled to a Magic Protocol (MP) block 514. The MP block 514 is coupled to first and second MACs, 516 and 518, respectively, and an I2S interface block 520. The I2S interface block 520 is as described above with respect to FIG. 4. The first and second MACs, 516 and 518, are coupled to first and second PHYs, 522 and 524, via a media-independent interface busses, 526 and 528, respectively. Each PHY is coupled to a connector 526 and 528. The MACs are also coupled via media-independent interface busses, 530 and 532, to third and fourth PHYs, 534 and 536, which are coupled to redundant connectors, 506 and 508, respectively, to provide failover ports. The first and second MACs, 516 and 518, have circuitry to detect when a link has failed, and switch operation to the failover port. In an alternate embodiment, no failover ports are provided and each MAC is coupled to a single PHY. Alternatively, only one of the ports has a failover port. In one embodiment, the first and second MACs, 516 and 518, respectively, and first, second, third and fourth PHYs, 522, 524, 534 and 536, operate at one gigabit per second. In an alternate embodiment, the first and second MACs, 516 and 518, respectively, and first, second, third and fourth PHYs, 522, 524, 534 and 536, operate at 100 megabits per second.

In one embodiment, the MCS block 512 is also coupled to a communications block 540. In one embodiment, the communications block implements the transmission control protocol/internet protocol (TCP/IP). Alternately, the communications block implements the universal datagram protocol (UDP). The communication block interfaces with a USB block 542 to provide a USB interface to communicate with a PC. Alternately, the MCS block 512 interfaces to a communication block 544 that is coupled to a MAC 546 which is coupled to an external PHY 548. The PC communicates is attached to the Magic network via the PHY 548 using standard internet protocol.

The ports operate at 100 megabits per second or one gigabit per second. The links may be implemented using Cat-5, coaxial or fiber-optic cable.

In an alternate embodiment, analog-to-digital and digital-to-analog converters, 552 and 554, are coupled to the I2S interface block 520, to provide a conventional analog interface.

Figure 22:
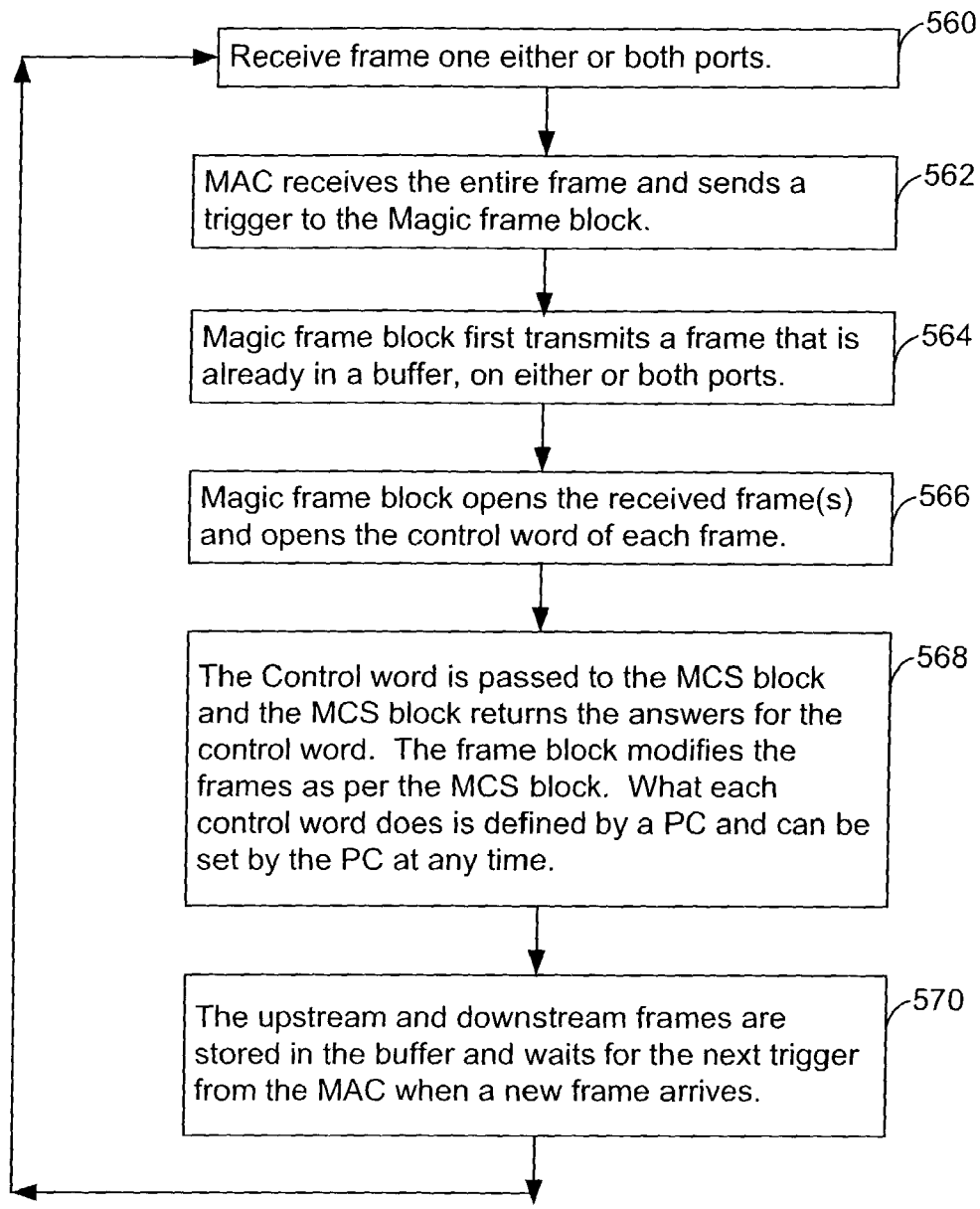
FIG. 22 depicts a flowchart of the operation of the two-port networking module of FIG. 21.

FIG. 22 depicts a flowchart illustrating the operation of the two-port gigabit module of FIG. 21. In step 560, frames with Magic packets are received on the A-port or the B-port. In step 562, the MAC, either on the A or B port side, receives the full packet and sends a trigger to the Magic frame block. In step 564, the Magic frame block first transmits a frame, an upstream frame and downstream frame, that is already in the buffer waiting on both ports. In step 566, the Magic frame block opens the received frame, from either the A or B port, and opens the control word of each frame. In step 568, the control word is passed to the MCS block and the MCS block returns the answers for the control word. The frame block modifies the frames as per the MCS block. What each control word does is defined by the personal computer and can be set by the personal computer at any time. In step 570, both the upstream and downstream frames are stored in the buffer and wait for a trigger from the MAC to be output when a new frame arrives. The process then continues to step 560.

Figure 23:
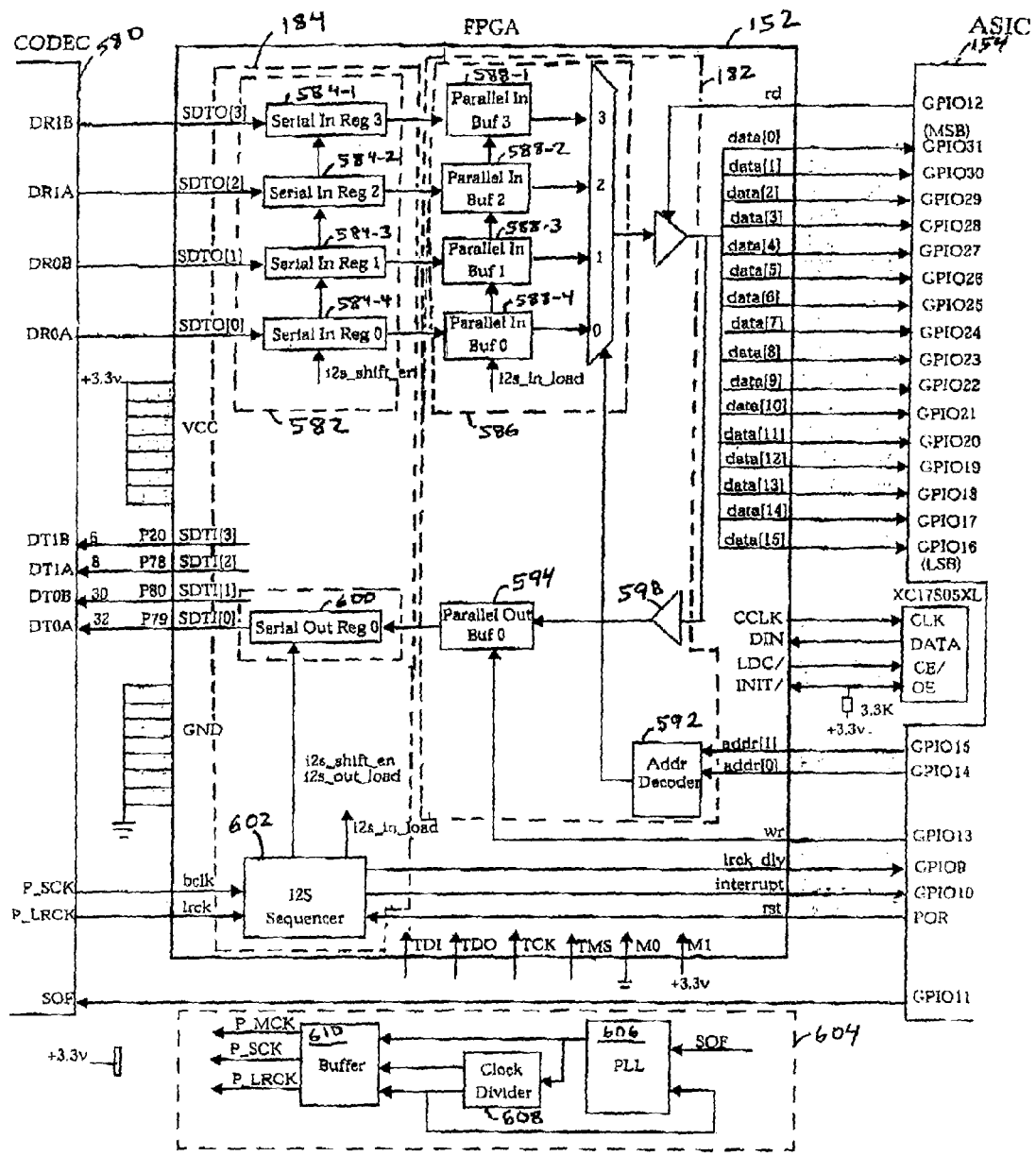
FIG. 23 depicts a more detailed diagram of an embodiment of the GPIO and I2S interfaces of the FPGA.

FIG. 23 depicts a circuit diagram of an embodiment of the GPIO and I2S interfaces, 182 and 184, respectively, in the FPGA 152. The FPGA 152 is coupled to a CODEC 580 and the ASIC 154. In the I2S interface block 184, a serial-input block 582 has four serial input registers, 584-1 to 584-4, to receive serial digital signals from the CODEC 580. In the GPIO interface block 182, a GPIO input block 586 has four parallel input buffers 588-1 to 588-4. Each of the inputs of the four parallel input buffers, 588-1 to 588-4, is coupled to a respective one of output of the serial input registers, 584-1 to 584-4. The outputs of the parallel input buffers, 588-1 to 588-4, are connected to a multiplexer 590. The select input of the multiplexer 590 is connected to an address decoder 592 which is connected to the GPIO bus. In the GPIO interface block 182, the input of a parallel output buffer 594 is coupled to the output of the multiplexer 590 via first and second buffers, 596 and 598, respectively. The output of the parallel output buffer 594 is supplied to a serial-out register 600 that provides a serial digital output signal.

In the I2S interface block 184, an I2S sequencer 602 is responsive to a subset of the signals on the GPIO bus and generates control signals for the I2S and GPIO interface blocks, 184 and 182, respectively, of the FPGA 152.

Also in the FPGA 152, a timing block 604 has a phase-locked loop (PLL) 606, a clock divider 608 and a buffer 610. In one embodiment, each frame being transmitted and/or received corresponds to one sample of the audio channels. In the timing block 604, a master clock (mclk) signal is generated by a Voltage Controlled Oscillator (VCO) in the PLL 606 as the central clock source. The clock divider circuit 608 divides the master clock signal to generate a bit clock (bclk) signal and an left-right clock signal (lrck). In one embodiment, the clock divider circuit 608 has a divide by four circuit to generate the bit clock signal (bclk) and a divide by two hundred fifty-six circuit to generate the left-right clock signal (lrck). The bit clock signal (bclk) is used to shift in and shift out the serial digital data through the CODEC 580. The left-right clock (lrck) signal is used to control the shifting of the left audio channel and the right audio channel with thirty-two bits each. Since the left-right clock signal (lrck) matches the audio sampling rate and is synchronized with the ASIC 154 on a per frame basis, the phase locked loop (PLL) 606 is used to ensure that the left-right clock signal (lrck) can be locked in to the same phase and frequency as the Start of Frame signal.

The start of frame (SOF) signal is asserted high by the receive frame procedure 172 (FIG. 4) through a GPIO pin each time a frame is received from a port and is being stored in a receive frame buffer. After the start of frame signal is asserted, a timer 230 (FIG. 5) is initiated to count to 10.4 microseconds. Upon detecting the timeout, the receive frame procedure 172 (FIG. 4) toggles the start of frame signal to low. The start of frame signal remains low until the next frame arrives. In this way, the start of frame signal is generated at a sampling frequency which can be used to synchronize the flow of the audio data on a per frame basis.

Each time an audio data sampling is completed, the CODEC 580 converts the analog signal sample to a serial digital signal. In other words, the CODEC 580 is an analog-to-digital converter, and outputs the digital signal serially, that is bit-by-bit. The serial digital signal flows through the I2S interface block 184 of the FPGA 152 to be shifted into the Serial Shift In Registers 584. Each audio channel (left and right) is associated with a shift in register 584. For example, in the CODEC 580 to ASIC 154 direction, if four audio channels are supported, four 16-bit serial shift in registers, 584-1 to 584-4, are used. Upon detecting that lrck is low, 16 bit audio data from each channel is shifted into the serial shift in register 584. After all 16 bits per channel are shifted in, the contents of the Shift-in register(s) 584 are loaded into the respective parallel input buffer(s) 588 and an interrupt is generated to the ASIC 154 through a GPIO pin. Upon receiving the interrupt, the send frame procedure in the instruction RAM of the ASIC 154 will output the read command via GPIO bus pin 12 (GPIO 12) along with the address (GPIO pins 14 and 15, GPIO 14 and GPIO 15, respectively) to read the 16 bit data from each parallel input buffer through the GPIO bus. Since data is being handled sixteen bits at a time, the ASIC 154 can tolerate sixteen bit latency which means the data should be read out within sixteen bit times upon receiving the interrupt. The above operation is repeated each time sixteen bits per channel of data is shifted in with an interrupt generation. After sixty-four bits per channel of data are shifted in, the lrck signal is checked again to start the next data shift in operation for the next sampled digital audio signals.

Each time a frame is being received into a receive frame buffer, the header is stripped off the payload to extract the digital audio signals. The ASIC firmware responds to the same interrupt and asserts a write command to store the digital audio signal from the receive frame buffer into a sixteen bit parallel output buffer 594 through GPIO pins. The digital audio signals will then be loaded into sixteen bit serial shift out register 600, which will be shifted out to the CODEC 580 when the lrck signal is low. Each time a sixteen bit shift out operation begins, the procedure in the ASIC's instruction RAM will have sixteen bit latency to load the next sixteen bit digital audio signal into the parallel output buffer 594. Upon the completion of each sixteen bit shift out operation, the next sixteen bit digital audio signal stored in the parallel output buffer 594 will be loaded into the serial shift out register 600. The above operation will continue until the bits of the digital audio signal are shifted out. The lrck signal will be checked again to start the next data shift out operation for the next audio sampling period.

Figure 24:
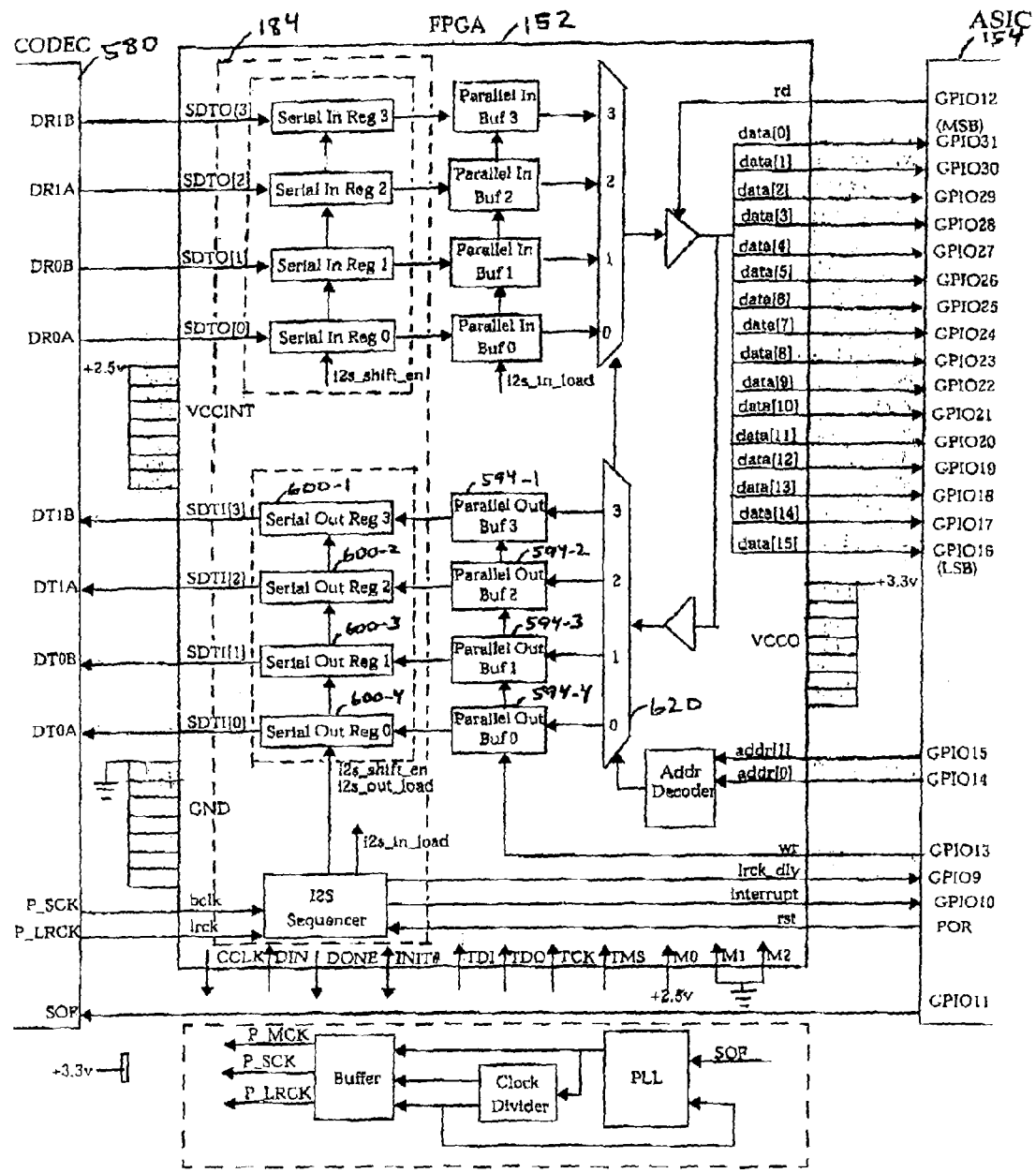
FIG. 24 depicts a more detailed diagram of an alternate embodiment of the GPIO and I2S interfaces of the FPGA.

FIG. 24 depicts a more detailed diagram of an alternate embodiment of the GPIO and I2S interfaces of the FPGA 152. This embodiment is the same as FIG. 23 except that more digital audio signals can be output. The I2S interface block 184 has four serial out registers, 600-1 to 600-4, and the GPIO interface block 182 a demultiplexer 620 coupled to four parallel output buffers, 594-1 to 594-4.

Figure 25:
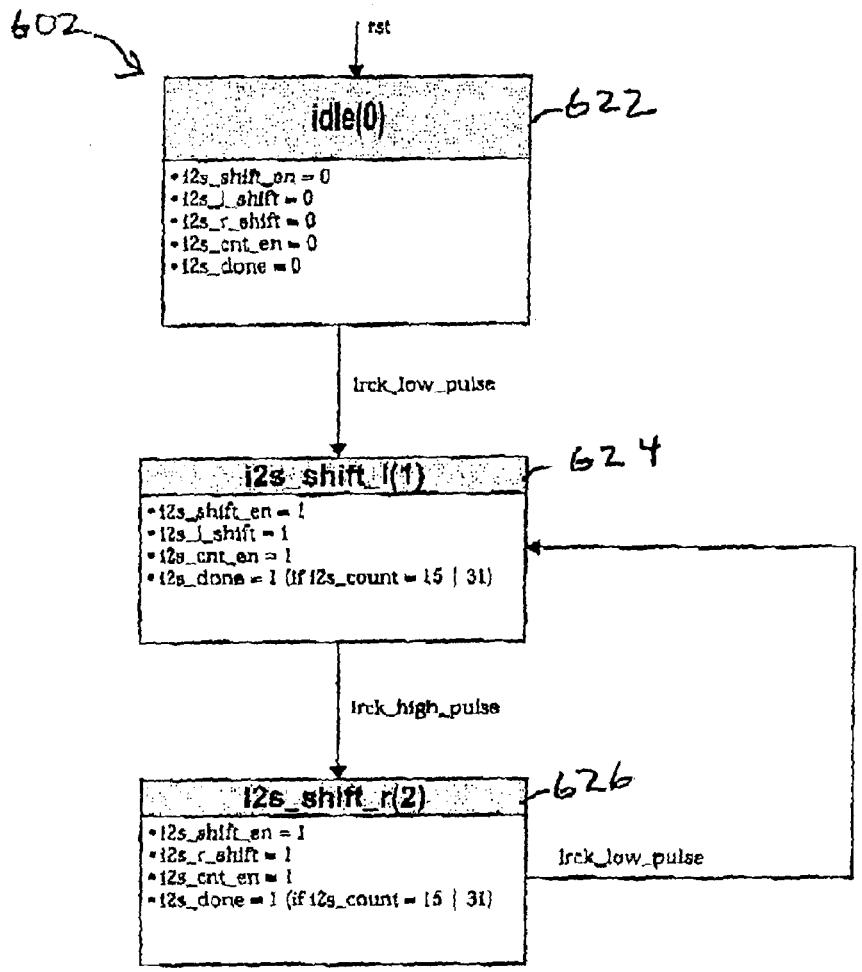
FIG. 25 depicts a flow diagram of the I2S sequencer of FIGS. 23 and 24.

FIG. 25 depicts a flow diagram of the I2S sequencer 602 of FIGS. 23 and 24. The I2S sequencer 602 cycles through idle (idle(0) 622, shift left (i2s_shiftl(1)) 624, and a shift right (i2s_shiftr(2)) 624 states. Initially, after a reset signal (rst) is asserted, the I2S sequencer 602 is initialized to the idle state 622. When the left-right signal transitions low, the I2S sequencer 602 proceeds to the shift left state 624. When the left-right signal transitions high, the I2S sequencer 602 proceeds to the shift right state 626. When the left-right signal transitions low again, the I2S sequencer proceeds back to the shift left state 624.

In the blocks representing the states, the levels of various signals are shown. Below the state diagram, exemplary pseudo-code illustrates the implementation of the I2S sequencer 602.

Figure 26:
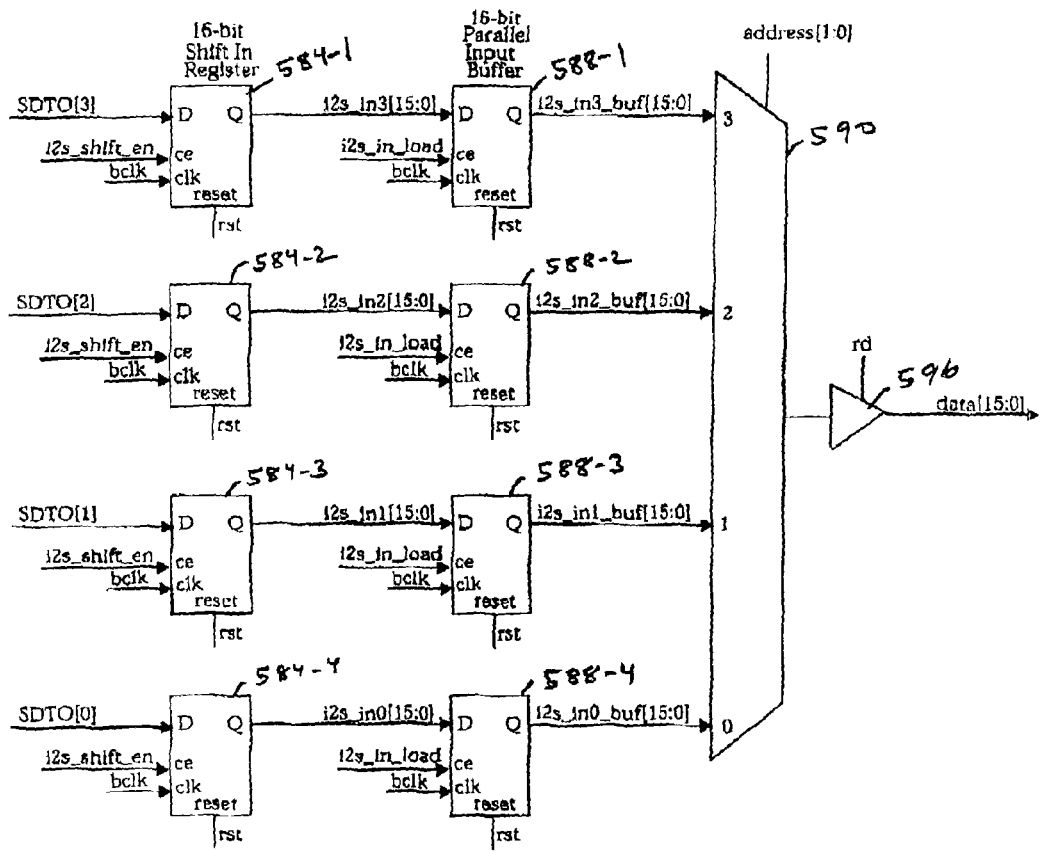
FIG. 26 depicts a more detailed diagram of the shift-in register and parallel input buffer of FIGS. 23 and 24.

FIG. 26 depicts a more detailed diagram of the shift-in registers, 584-1 to 584-4, and parallel input buffers, 588-1 to 588-4, respectively, of FIGS. 23 and 24. A set of shift registers 584 each receive the digital audio signals, in I2S format, from the CODEC 580 when the bit clock transitions high. When the I2S sequencer 602 asserts the i2s_in_load signal, the parallel input buffers 588 each load the output of their respective shift in registers 584. The output of the parallel input buffers 588 is supplied to the output multiplexer 590. An set of output buffers are connected to the output of the output multiplexer to supply digital audio signals to the GPIO bus when the rd signal is asserted by the software on the GPIO bus.

Figure 27:
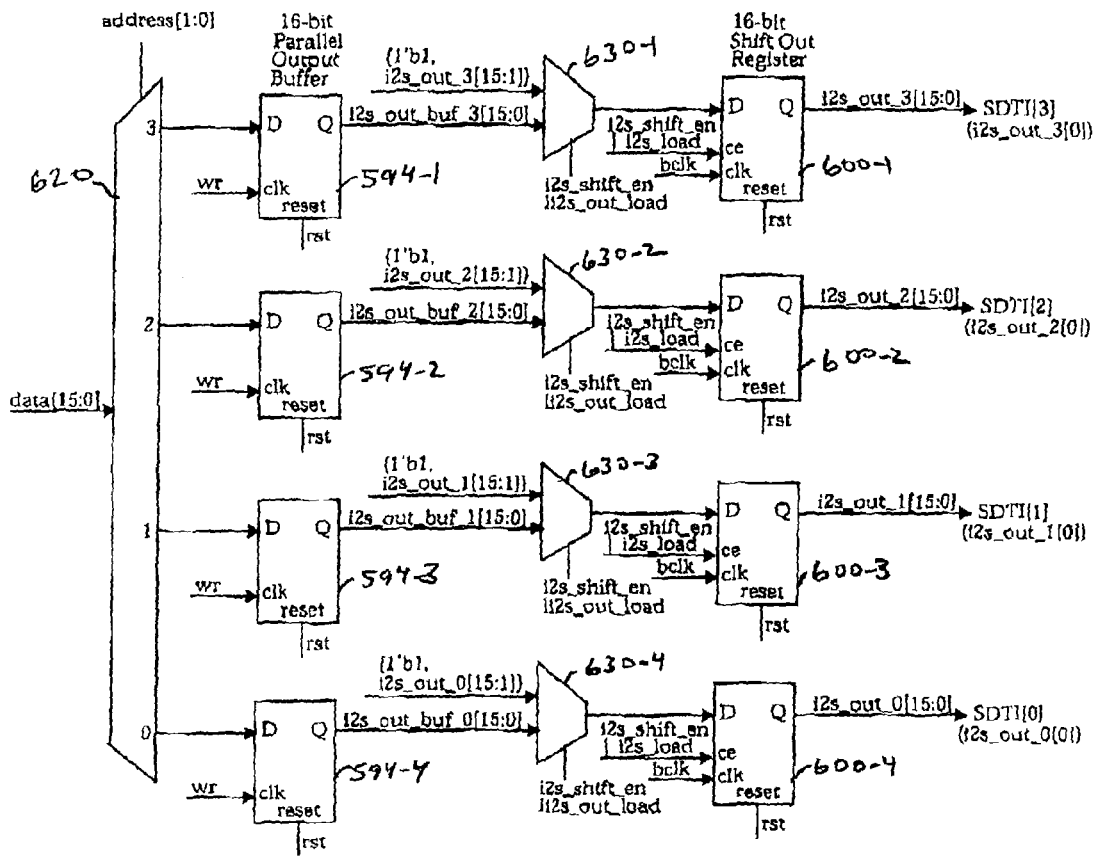
FIG. 27 depicts a more detailed diagram of the parallel output buffer and serial shift out register of FIGS. 23 and 24.

FIG. 27 depicts a more detailed diagram of the parallel output buffers 594 and serial shift out registers 600 of FIGS. 22 and 23. The GPIO bus supplies a digital audio signal to an input demultiplexer 620. Based on the address, supplied by the GPIO bus, the input demultiplexer 620 outputs the digital audio signal to one of the parallel output buffers 594. The parallel output buffers 594 load the digital audio signal in response to the wr signal. A multiplexer, 630-1 to 630-4, receives the output of the parallel output buffers, 594-1 to 594-4, and also a shifted audio signal from a shift out register, 600-1 to 600-4, respectively. Based on the state of the selection signals, the output of the parallel output buffers 594 is supplied to the shift out registers 600 and loaded in response to the bit clock, i2s_shift_en and i2s_load signals that are generated by the I2S sequencer. In response to the bit clock, the digital audio signal in the shift out register 600 is output serially, as a serial digital audio signal.

An interrupt is generated each time 16-bits of data per channel is shifted in and being loaded into a parallel input buffer to provide four interrupts per frame. Upon receiving the interrupt, the ASIC has about 5,208.3 nanoseconds to read four 16-bits of data from the four parallel input buffers to GPIO bus lines 31-16, and write 16-bit audio data from GPIO bus lines 31-16 to the parallel output buffer. The lrck_dly signal is a sixteen bit delayed version of the lrck signal which is sent to the GPIO on line 9. This signal can be used by firmware to determine the state of the left channel (lrck_dly=0) and right channel (lrck_dly=1).

In another embodiment, one of the ports of the two port module may connect to a device that uses standard ethernet, such as a computer. In this embodiment, the MAC is a standard MAC with collision detection circuitry as described above. The networking module recognizes that the connection is standard ethernet because the frames would not be arriving at 20.84 microsecond intervals. Frames may arrive sooner or later. The processor can use timers, implemented in either hardware or software, to determine the time between successive frames. If the time between successive frames is not equal to 20.84 microseconds, the networking module determines that standard ethernet is being used and processes the frames accordingly.

Alternately, when the processor detects that the frames are being received at 20.84 microsecond intervals, the processor determines that Magic protocol is being used and process the frames accordingly.

Referring back to FIGS. 4 and 5, in yet another embodiment, software may be downloaded into the program memory 170 or the instruction RAM 216 of the networking module via a port. Either an A-port or a B-port may be used. A smart logic block in the networking module determines when a program is to be downloaded into the program memory 170. In one embodiment, the process that determines whether Magic frames or standard ethernet frames are being received, discussed above, is implemented in the logic block. If standard ethernet frames are being received, the networking module determines whether commands, within the frames, are to update the program memory 170 with new software. A secure exchange of frames is implemented so that only an authorized user can download a new program to the program memory 170. Alternately, the new program is downloaded to the instruction RAM 216, rather than the program memory 170. Software may be downloaded in this manner to any of the networking modules discussed above.

The invention has been described by way of specific embodiments, but those skilled in the art will understand that various changes in form and detail may be made without deviating from the spirit or scope of the invention.

What is claimed is:

1. A multi media system comprising:
a plurality of networking modules, coupled to each other, at least a subset of the networking modules receiving control information in frames, wherein at least one of the networking modules includes a media access controller (MAC), a first physical layer interface (PHY), and a second PHY, wherein the MAC is coupled to the first PHY and the second PHY, and wherein the first PHY is associated with a first link between the at least one networking module and another one of the networking modules, and the second PHY is associated with a second link between the at least one networking module and the another networking module; and
a computer coupled to the at least one networking module, the computer comprising a networking module application program to control the networking modules by supplying the control information to the at least one networking module.

2. The multi media system of claim 1 wherein the control information comprises information to assign audio channels.

3. The multi media system of claim 1 wherein the at least one networking module receives monitoring information from at least one other networking module, and provides the monitoring information to the networking module application program.

4. The multi media system of claim 1 wherein the networking module application program receives digital audio signals from the networking modules, mixes the audio signals, and transmits the mixed audio signals to the at least one networking module.

5. The multi media system of claim 1, wherein the MAC is configured to transmit frames from the at least one networking module to the another networking module via the first PHY and the first link, and
wherein, in response to a detection by the MAC that the first link has failed, the MAC is configured to switch the transmission of the frames to the another networking module via the second PHY and the second link.

* * * * *